US012655247B2

(12) United States Patent
Condie et al.

(10) Patent No.: US 12,655,247 B2
(45) Date of Patent: Jun. 16, 2026

(54) TWO COMPONENT COATING COMPOSITIONS

(71) Applicant: PPG Industries Ohio, Inc., Cleveland, OH (US)

(72) Inventors: Allison G. Condie, Valencia, PA (US); Masayuki Nakajima, Wexford, PA (US); Hongying Zhou, Allison Park, PA (US); Maria S. French, Canfield, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 799 days.

(21) Appl. No.: 17/440,411

(22) PCT Filed: Mar. 19, 2020

(86) PCT No.: PCT/US2020/023649

§ 371 (c)(1),
(2) Date: Sep. 17, 2021

(87) PCT Pub. No.: WO2020/191202

PCT Pub. Date: Sep. 24, 2020

(65) Prior Publication Data

US 2022/0162375 A1 May 26, 2022

Related U.S. Application Data

(60) Provisional application No. 62/820,968, filed on Mar. 20, 2019.

(51) Int. Cl.

| | |
|---|---|
| ***C08G 59/24*** | (2006.01) |
| ***B29C 64/106*** | (2017.01) |
| ***B29C 64/314*** | (2017.01) |
| ***B29K 63/00*** | (2006.01) |
| ***B33Y 10/00*** | (2015.01) |
| ***B33Y 40/10*** | (2020.01) |
| ***B33Y 70/00*** | (2020.01) |
| ***C08G 59/40*** | (2006.01) |
| ***C08G 59/50*** | (2006.01) |
| ***C08G 59/64*** | (2006.01) |
| ***C08G 59/66*** | (2006.01) |
| ***C09D 163/00*** | (2006.01) |
| ***C09J 5/00*** | (2006.01) |
| ***C09J 163/00*** | (2006.01) |

(52) U.S. Cl.

CPC .......... *C08G 59/245* (2013.01); *B29C 64/106* (2017.08); *B29C 64/314* (2017.08); *B33Y 10/00* (2014.12); *B33Y 40/10* (2020.01); *B33Y 70/00* (2014.12); *C08G 59/4042* (2013.01); *C08G 59/504* (2013.01); *C08G 59/64* (2013.01); *C08G 59/66* (2013.01); *C09D 163/00* (2013.01); *C09J 5/00* (2013.01); *C09J 163/00* (2013.01); *B29K 2063/00* (2013.01); *C09J 2463/00* (2013.01)

(58) Field of Classification Search

CPC .......... C09D 163/00; C09J 5/00; C09J 163/00
See application file for complete search history.

(56) References Cited

U.S. PATENT DOCUMENTS

| | | | |
|---|---|---|---|
| 4,793,867 | A | 12/1988 | Charles |
| 4,952,621 | A | 8/1990 | Bandlish |
| 4,954,577 | A | 9/1990 | Dunwald et al. |
| 5,588,989 | A | 12/1996 | Vonk |
| 6,172,143 | B1 | 1/2001 | Amano et al. |
| 6,331,226 | B1 | 12/2001 | Imashiro et al. |
| 6,440,258 | B1 | 8/2002 | Imashiro et al. |
| 6,524,711 | B2 | 2/2003 | Imashiro et al. |
| 6,913,798 | B2 | 7/2005 | Kitamura et al. |
| 7,541,075 | B2 | 6/2009 | Kitamura et al. |
| 7,714,030 | B2 | 5/2010 | Lekovic et al. |
| 7,749,368 | B2 | 7/2010 | McMurdie |
| 8,673,091 | B2 | 3/2014 | McMillan |
| 9,315,698 | B2 | 4/2016 | Zaffaroni et al. |

(Continued)

FOREIGN PATENT DOCUMENTS

| | | | |
|---|---|---|---|
| CN | 103222040 B | * 12/2015 | ............ C09J 163/00 |
| CN | 109735282 B | 4/2020 | |

(Continued)

OTHER PUBLICATIONS

Machine translation of CN-103222040-B (Year: 2015).*
International Search Report and Written Opinion received for PCT Application Serial No. PCT/US2020/023649 dated Sep. 24, 2020, 12 pages.
Tong Rong et al. “Synthesis and Applciation of Aqueous Polycarbodiimide Crosslinking Agent”, China Leather vol. 40, No. 15, Issued Aug. 3, 2011, pp. 10-15.

(Continued)

*Primary Examiner* — Wenwen Cai

(57) ABSTRACT

Disclosed is a coating composition comprising a first component and a second component. The first component comprises a diluent and a carbodiimide present in an amount of no more than 50 percent by weight based on total weight of the coating composition. The second component comprises a curing agent that chemically reacts with the carbodiimide, the curing agent comprising an active hydrogen-containing compound. The coating composition may be an adhesive composition or a sealant composition. Also disclosed is a method for treating a substrate comprising contacting at least a portion of a surface of the substrate with a composition of the present invention. Also disclosed is a substrate comprising a surface at least partially coated with a layer formed from a composition of the present invention. Also disclosed is an article comprising a first substrate and a second substrate and a composition of the present invention positioned between the first and second substrates.

29 Claims, 1 Drawing Sheet

(56) References Cited

U.S. PATENT DOCUMENTS

| | | | |
|---|---|---|---|
| 2002/0081434 | A1 | 6/2002 | Imashiro et al. |
| 2005/0143496 | A1 | 6/2005 | Mueller |
| 2012/0129980 | A1 | 5/2012 | Desai et al. |
| 2013/0267136 | A1 | 10/2013 | Salnikov et al. |
| 2014/0150970 | A1 | 6/2014 | Desai et al. |
| 2014/0299270 | A1 | 10/2014 | Asay et al. |
| 2015/0165670 | A1 | 6/2015 | Hebert et al. |
| 2015/0203728 | A1 | 7/2015 | Burckhardt et al. |
| 2017/0267806 | A1 | 9/2017 | Goeschel et al. |

FOREIGN PATENT DOCUMENTS

| | | | |
|---|---|---|---|
| CN | 109762501 | B | 6/2020 |
| CN | 104640898 | A | 1/2023 |
| EP | 0767188 | A1 | 4/1997 |
| EP | 1170315 | A1 | 1/2002 |
| KR | 2017-0083250 | A | 7/2017 |
| WO | 2018075902 | A1 | 4/2018 |
| WO | 2018157148 | A1 | 8/2018 |
| WO | 2020222897 | A1 | 11/2020 |
| WO | 2021025756 | A1 | 2/2021 |
| WO | 2021119419 | A1 | 6/2021 |
| WO | WO2021211184 | A1 | 10/2021 |
| WO | 2022010972 | A1 | 1/2022 |

OTHER PUBLICATIONS

Hongzhe et al., "Woodworking Bonding Technology", China Architecture & Building Press, Dec. 31, 1985, pp. 26-27.

* cited by examiner

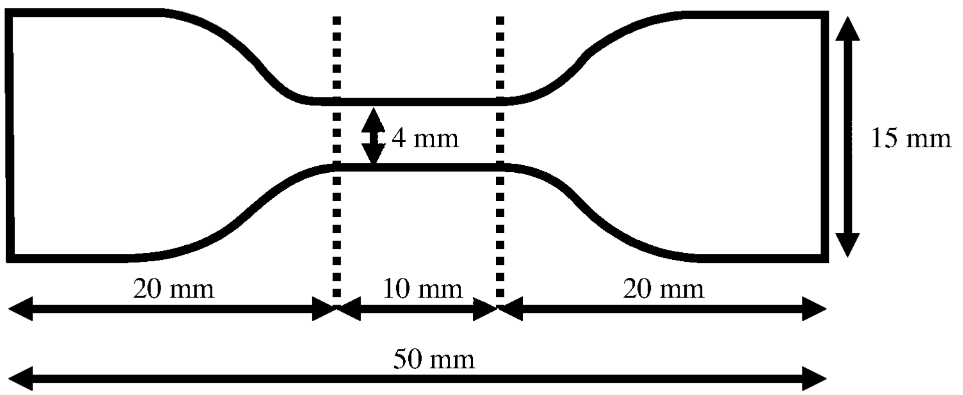
4 mm
15 mm
20 mm
10 mm
20 mm
50 mm

TWO COMPONENT COATING COMPOSITIONS

CROSS-REFERENCE TO RELATED APPLICATIONS

This application claims the benefit of U.S. Provisional Patent Application Ser. No. 62/820,968 filed on Mar. 20, 2019, incorporated herein by reference.

FIELD OF THE INVENTION

The present invention relates to adhesive and sealant compositions and more particularly to 2K adhesive and sealant compositions.

BACKGROUND OF THE INVENTION

Coating compositions, including sealants and adhesives, are utilized in a wide variety of applications to treat substrates, including to bond together two or more substrate materials.

SUMMARY OF THE INVENTION

The present invention is directed to a two-component coating composition comprising: a first component comprising a diluent and a carbodiimide present in an amount of no more than 50 percent by weight based on total weight of the coating composition; and a second component comprising a curing agent that chemically reacts with the carbodiimide, the curing agent comprising an active hydrogen-containing compound. The coating composition may be an adhesive composition or a sealant composition.

The present invention also is directed to a method for forming a coating on a first substrate, comprising: applying a coating composition of the present invention to at least a portion of a surface of the first substrate and at least partially curing the coating composition at ambient or slightly thermal conditions, and optionally exposing the composition to a temperature of at least 70° C.

The present invention also is directed to a substrate comprising a coating composition of the present invention positioned on at least a portion of a surface of the substrate.

BRIEF DESCRIPTION OF THE DRAWING

FIG. 1 shows a schematic of the dog bone specimen utilized in the tensile testing for the sealant compositions of the present invention.

DETAILED DESCRIPTION OF THE INVENTION

For purposes of this detailed description, it is to be understood that the invention may assume alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

In this application, the use of the singular includes the plural and plural encompasses singular, unless specifically stated otherwise. For example, although reference is made herein to "a" carbodiimide, "a" curing agent, and "an" epoxy-containing compound, a combination (i.e., a plurality) of these components may be used. In addition, in this application, the use of "or" means "and/or" unless specifically stated otherwise, even though "and/or" may be explicitly used in certain instances.

As used herein, "composition" or "coating composition" refers to a solution, mixture, or dispersion in a medium that, in an at least partially dried or cured state, is capable of producing a film, layer, or the like on at least a portion of a substrate surface.

As used herein, the term "dispersion" refers to a mixture that may be a homogenous or a heterogenous transparent, translucent or opaque system made by blending two or more chemical compounds.

As used herein, the term "adhesive composition" and "adhesive coating composition" means a coating composition which, in an at least partially cured state, is capable of holding two surfaces together when brought into contact.

As used herein, "green strength" or "green lap shear strength" means the ability of an adhesive coating composition, following at least partial cure at ambient or slightly thermal conditions and prior to exposure to an external energy source, to produce a load-bearing joint having a lap shear strength of at least 0.1 MPa as determined according to ASTM D1002-10 by using an Instron 5567 machine in tensile mode with a pull rate of 1 mm per minute.

As used herein, the term "structural adhesive" means an adhesive coating composition which, following at least partial cure by the two-step curing process described herein, produces a load-bearing joint having a lap shear strength of greater than 5 MPa as determined according to ASTM D1002-10 by using an Instron 5567 machine in tensile mode with a pull rate of 1 mm per minute.

As used herein, a "sealant composition" and "sealant coating composition" refer to a coating composition which, following at least partial cure by the two-step curing process described herein, forms a seal that has the ability to resist atmospheric conditions, such as moisture and temperature and at least partially block the transmission of materials, such as water, fuel, and other liquids and gasses.

As used herein, the term "cure", "cured", "curing," or similar terms, as used in connection with the compositions described herein, means that at least a portion of the components that form the composition are crosslinked to form a layer or bond, such as by subjecting said composition to conditions (referred to as "curing conditions") that lead to the reaction of the reactive functional groups of the components of the composition and resulting in the crosslinking of at least a portion of the components of the composition.

As used herein, the term "at least partially cure," "at least partially cured," or similar terms, as used in connection with the compositions described herein, means subjecting the composition to curing conditions to form a layer or bond, wherein reaction of at least a portion of the reactive groups of the components of the composition occurs.

As used herein, a "two-component composition" (or "2K composition") refers to a composition in which at least a portion of the reactive components readily react and at least partially cure without activation from an external energy source, such as at ambient or slightly thermal conditions, when mixed. One of skill in the art understands that the two components of the composition are stored separately from each other and mixed just prior to application of the composition. As described in more detail below, the 2K coating compositions of the present invention may be subjected to "curing conditions" comprising (1) a first step wherein at least a portion of the first component and the second component chemically react when mixed to at least partially cure the adhesive composition without activation from an external energy source (i.e., at ambient or slightly thermal conditions), optionally followed by (2) a second step wherein an external energy source is applied to the coating composition to further cure the coating composition. As further defined herein, ambient conditions generally refer to room temperature (about 23° C.) and humidity conditions (e.g., about 50%) or temperature and humidity conditions that are typically found in the area in which the adhesive is being applied to a substrate, while slightly thermal conditions are temperatures that are slightly above ambient temperature, such as, e.g., 10% greater, but are generally below the curing temperature for the second-step of the two-step curing process.

As used herein, "Mw" refers to the weight average molecular weight and means the experimental value as determined by Gel Permeation Chromatography using Waters 2695 separation module with a Waters 410 differential refractometer (RI detector) and polystyrene standards, tetrahydrofuran (THF) used as the eluent at a flow rate of 1 ml $min^{-1}$, and two PL Gel Mixed C columns used for separation.

As used herein, "Mn" refers to the number average molecular weight and means the experimental value as determined by Gel Permeation Chromatography using Waters 2695 separation module with a Waters 410 differential refractometer (RI detector) and polystyrene standards, tetrahydrofuran (THF) used as the eluent at a flow rate of 1 ml $min^{-1}$, and two PL Gel Mixed C columns used for separation.

As used herein, the term "accelerator" means a substance that increases the rate or decreases the activation energy of a chemical reaction. An accelerator may be either a "catalyst," that is, without itself undergoing any permanent chemical change, or may be reactive, that is, capable of chemical reactions and includes any level of reaction from partial to complete reaction of a reactant.

As used herein, unless indicated otherwise, the term "substantially free" means that a particular material is not purposefully added to a mixture or composition, respectively, and is only present as an impurity in a trace amount of less than 5 percent by weight based on a total weight of the mixture or composition, respectively. As used herein, unless indicated otherwise, the term "essentially free" means that a particular material is only present in an amount of less than 2 percent by weight based on a total weight of the mixture or composition, respectively. As used herein, unless indicated otherwise, the term "completely free" means that a mixture or composition, respectively, does not comprise a particular material, i.e., the mixture or composition comprises 0 percent by weight of such material.

As used herein, the term "glass transition temperature" ("Tg") refers to the temperature at which an amorphous material, such as glass or a polymer, changes from a brittle vitreous state to a plastic or rubbery state or from a plastic or rubbery state to a brittle vitreous state.

As used herein, the term "dog bone" or "dog bone specimen" refers to the specimen illustrated schematically in FIG. 1 and utilized in the tensile testing for the sealants the present invention. The dog bone specimen was die-cut from a 3 mm thick sealant film.

The present invention is directed to a two-component coating composition comprising, or consisting essentially of, or consisting of, a first component and a second component. The first component may comprise, consist essentially of, or consist of a carbodiimide and a diluent, wherein the carbodiimide is present in an amount of no more than 50 percent by weight based on total weight of the coating composition. The second component may comprise, consist essentially of, or consist of a curing agent that chemically reacts with the carbodiimide of the first component, the curing agent comprising an active hydrogen-containing compound.

As discussed above, the composition of the present invention comprises a first component. The first component comprises a carbodiimide. As used herein, "carbodiimide" refers to an aliphatic and/or aromatic dinitrogen analogue of carbonic acid of the generalized structure: $—RN{=}C{=}NR_1$, where R and $R_1$ are independently aliphatic or aromatic groups. The carbodiimide may be a solid or a liquid at ambient conditions (25° C., 1 atm) or, as discussed in more detail below, may be dissolved or dispersed in a reactive diluent or a non-reactive diluent.

In examples, the carbodiimide may be prepared by a decarbonation reaction of (A) an isocyanate having at least two isocyanate groups bonded to the carbon of the methylene group in the molecule (a "diisocyanate"), (B) an acyclic, aliphatic, or aromatic diisocyanate other than that defined in (A), and (C) a monofunctional organic compound (hydroxyl, amine, and/or mono isocyanate functional) to terminate the isocyanate groups of the resultant decarbonated condensation reaction product of the (A) and (B) components. Optionally, the decarbonation reaction may occur in the presence of a catalyst for carbodiimidization. Useful diisocyanates include compounds such as hexamethylene 1,6-diisocyanate, toluene diisocyanate, m-phenylene diisocyanate, p-phenylene diisocyanate, xylylene diisocyanate, 4,4'- diphenyl methane diisocyanate, 2,4'-diphenyl methane diisocyanate, 2,2'-diphenyl methane diisocyanate, hexamethylene diisocyanate, isophorone diisocyanate, polymethylenepolyphenyl diisocyanate, 3,3'-dimethyl-4,4'-biphenylene diisocyanate, 3,3'-dimethyl-4,4'-diphenylmethane diisocyanate, 3,3-dichloro-4,4'-biphenylene diisocyanate or 1,5-naphthalene diisocyanate. Useful monofunctional isocyanate include compounds such as cyclohexylisocyante, 3-Isopropenyl-α,α-dimethylbenzyl isocyanate (m-TMI). In addition, exemplary useful carbodiimides based on isocyanates include those sold under the trade names Lupranate® available from BASF, Zoldine® available from Angus Chemical Company, Stabaxol® available from RheinChemie Additives, Carbodilite® available from Nisshinbo, and Picassian® available from Stahl Polymers may be utilized.

Optionally, the carbodiimide may comprise a urethane group and/or a urea group. As used herein, the term "urethane group" refers to any derivative of carbamic acid having the generalized structure:

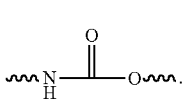

As used herein, the term "urea group" refers to any organic moiety having the generalized structure:

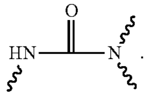

For example, the carbodiimide may be at least one of the following structures:

[Structure 1]

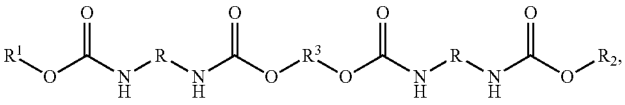

where R =

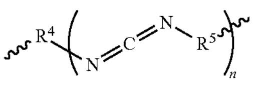

or

[Structure 2]

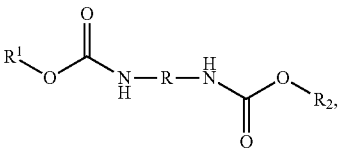

where R =

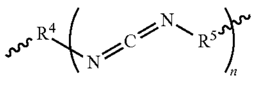

or

[Structure 3]

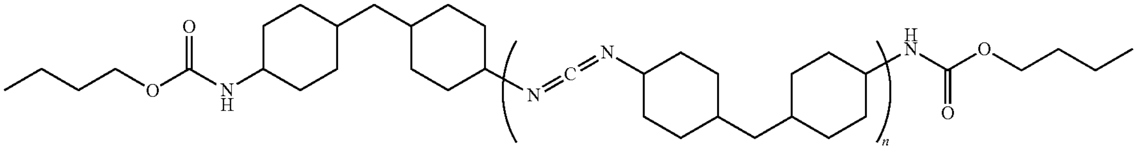

In each of Structures I-II, $R^1$-$R^5$ are not hydrogen and are aliphatic or aromatic. In Structures I-III, n>1.

The carbodiimide of the present invention may have a weight average molecular weight of at least 1,000 g/mol as determined by Gel Permeation Chromatography using Waters 2695 separation module with a Waters 410 differential refractometer (RI detector) and polystyrene standards, tetrahydrofuran (THF) used as the eluent at a flow rate of 1 ml $min^{-1}$, and two PL Gel Mixed C columns used for separation, such as at least 1,500 g/mol, such as at least 1,700 g/mol, and in some instances, may have a molecular weight of no more than 10,000 g/mol as determined by Gel Permeation Chromatography using Waters 2695 separation module with a Waters 410 differential refractometer (RI detector) and polystyrene standards, tetrahydrofuran (THF) used as the eluent at a flow rate of 1 ml $min^{-1}$, and two PL Gel Mixed C columns used for separation, such as no more than 5,000 g/mol, such as no more than 3,500 g/mol. The carbodiimide of the present invention may have a molecular weight of 1,000 g/mol to 10,000 g/mol as determined by Gel Permeation Chromatography using Waters 2695 separation module with a Waters 410 differential refractometer (RI detector) and polystyrene standards, tetrahydrofuran (THF) used as the eluent at a flow rate of 1 ml $min^{-1}$, and two PL Gel Mixed C columns used for separation, such as 1,500 g/mol to 5,000 g/mol, such as 1,700 g/mol to 3,500 g/mol.

The carbodiimide may be present in the first component in an amount of at least 2.5 percent by weight based on total weight of the composition, such as at least 5 percent by weight, such as at least 10 percent by weight, such as at least 11 percent by weight, and may be present in the first component in an amount of no more than 50 percent by weight based on total weight of the composition, such as no more than 40 percent by weight, such as no more than 30 percent by weight, such as no more than 22 percent by weight. The carbodiimide may be present in the first component in an amount of 2.5 percent by weight to 50 percent by weight based on total weight of the composition, such as 5 percent by weight to 40 percent by weight, such as 10 percent by weight to 30 percent by weight, such as 11 percent by weight to 22 percent by weight.

The carbodiimide may be dispersed or dissolved in a diluent, such as in a reactive diluent and/or a non-reactive diluent. As used herein, the term "diluent" means a compound that has a viscosity of up to 20,000 mPa·s at 25° C. as measured according to ASTM D789. The diluent may lower the viscosity of the carbodiimide-containing mixture.

As used herein, the term "reactive diluent," when used with respect to the diluent in which the carbodiimide may be dispersed, means a diluent comprising an epoxy-containing compound that is capable of reacting through the epoxy moiety in order to cross-link, that is, an epoxy-containing compound that may be formed from monomers capable of internally crosslinking, or an epoxy-containing compound that may be capable of reacting with its own species of compound or a different species of compound, including with epoxy-containing compounds present in the first component that are not reactive diluents (i.e., those having a viscosity of greater than 20,000 mPa·s at 25° C. as measured according to ASTM D789) and/or the curing agent of the second component. As used herein with respect to the reactive diluent, the term "its own species" means another epoxy-containing compound that has a chemical structure identical to that of the reactive diluent, and the term "a different species" means an epoxy-containing compound that has a chemical structure different from that of the reactive diluent or a compound having a functional group other than an epoxide functional group that is capable of reacting with the epoxide functional group of the reactive diluent, such as an amine functional group and/or a thiol functional group by way of non-limiting examples. The epoxy-containing compound may be any of the epoxy-containing compounds described herein below with respect to the epoxy-containing compound optionally present in the first component. As used herein, the term "non-reactive diluent" refers to a monomer or a polymer that is not intended to react with components of the first component or the second component of the two-component system (i.e., the non-reactive diluent is non-epoxidized).

As noted above, the diluent may have a viscosity of up to 20,000 mPa·s at 25° C. as measured according to ASTM D789. By way of non-limiting example, the diluent may have a viscosity of at least 1 mPa·s at 25° C. as measured according to ASTM D789, such as at least 5 mPa·s, such as at least 50 mPa·s, such as at least 300 mPa·s, such as at least 1,000 mPa·s, such as at least 10,000 mPa·s, and may have a viscosity of no more than 20,000 mPa·s at 25° C. as measured according to ASTM D789, such as no more than 17,000 mPa·s, such as no more than 700 mPa·s, such as no more than 100 mPa·s. By way of non-limiting example, the diluent may have a viscosity of 1 mPa·s to 20,000 mPa·s at 25° C. as measured according to ASTM D789, such as for example, 5 mPa·s to 100 mPa·s, such as 300 mPa·s to 700 mPa·s, such as 10,000 mPa·s to 17,000 mPa·s.

The diluent may be present in the first component in an amount of at least 5 percent by weight based on total weight of the composition, such as at least 7 percent by weight, such as at least 15 percent by weight, and may be present in the first component in an amount of no more than 55 percent by weight based on total weight of the composition, such as no more than 50 percent by weight, such as no more than 45 percent by weight. The reactive diluent may be present in the first component in an amount of 5 percent by weight to 55 percent by weight based on total weight of the composition, such as 7 percent by weight to 50 percent by weight, such as 15 percent by weight to 45 percent by weight.

Those skilled in the art will understand that the carbodiimide of the first component is substantially stable in the presence of the diluent until the introduction of an external energy source, an accelerator (described below) or one of the curing agents of the second component (described below).

The reactive diluent may be a monomer or a polymer, and may be mono-functional, bi-functional, or multi-functional. Suitable examples of reactive diluent may include any of the epoxy-containing compounds described below which have a viscosity of up to 20,000 mPa·s at 25° C. as measured according to ASTM D789, including Cardura E10P (available from Hexion Inc.), polyglycidyl ethers of Bisphenol A and Bisphenol F, 1,4-butandiol diglycidyl ether (available as Heloxy modifier BD from Hexion), 1,6-hexanediol diglycidyl ether, mono-functional aliphatic diluents (Epotec RD 108, RD 109, RD 188 available from Aditya Birla), and mono-functional aromatic reactive diluents (Epotec RD 104, RD 105, and RD 136 available from Aditya Birla). Other suitable examples of the reactive diluent include epoxidized oils such as glycerides of polyunsaturated fatty acids such as sunflower oil, safflower oil, soybean oil, linseed oil, castor oil, orange oil, rapeseed oil, tall oil, vegetable processing oil, vulcanized vegetable oil, high oleic acid sunflower oil, cottonseed oil, nut oils, and combinations thereof. The reactive diluent of the present invention also may be epoxy functionalized homopolymers of 1,2-butadiene or 1,4-butadiene or combinations thereof, epoxy functionalized copolymers of butadiene and acrylic or olefin monomers, or combinations thereof.

The reactive diluent may have a boiling point of greater than 100° C., such as greater than 130° C., such as greater than 150° C.

In examples, a ratio of a theoretical epoxide equivalent weight of the reactive diluent to a theoretical carbodiimide equivalent weight of the carbodiimide may be at least 1.1:1, such as at least 2:1, and in some instances may be no more than 100:1, such as 50:1. In examples, the theoretical epoxide equivalent weight of the reactive diluent to the theoretical carbodiimide equivalent weight of the carbodiimide may be 1.1:1 to 100:1, such as 2:1 to 50:1. The theoretical epoxide equivalent weight may be determined by dividing the number average molecular weight of the epoxy-containing compound by the theoretical number of epoxide groups per molecule of epoxy-containing compound. The theoretical carbodiimide equivalent weight may be determined by dividing the number average molecular weight of the carbodiimide by the theoretical number of carbodiimide groups per molecule of carbodiimide.

In examples, the non-reactive diluent may include non-epoxidized oils such as sunflower oil, safflower oil, soybean oil, linseed oil, castor oil, orange oil, rapeseed oil, tall oil, vegetable processing oil, vulcanized vegetable oil, high oleic acid sunflower oil, cottonseed oil, nut oils, and combinations thereof. Other non-reactive diluents include homopolymers of 1,2-butadiene or 1,4-butadiene or combinations thereof, copolymers of butadiene and acrylic or olefin monomers, or combinations thereof. Other non-reactive diluents include glycols or polyols are described above. Other non-reactive diluents include diisononylphthalate (Jayflex DINP available from Exxon Mobile), diisodecylphthalate (Jayflex DIDP available from Exxon Mobile), and alkyl benzyl phthalate (Santicizer 278 available from Valtris); benzoate-based non-reactive diluents such as dipropylene glycol dibenzoate (K-Flex® available from Emerald Performance Materials); and other non-reactive diluents including terephthalate-based dioctyl terephthalate (DEHT available from Eastman Chemical Company), alkylsulfonic acid ester of phenol (Mesamoll available from Borchers), and 1,2-cyclohexane dicarboxylic acid diisononyl ester (Hexamoll DINCH available from BASF).

The total solids content of the carbodiimide dispersion or solution may be at least 40 percent by weight based on total weight of the carbodiimide dispersion, such as at least 60 percent by weight, such as at least 80 percent by weight, and may be no more than 100 percent by weight based on total weight of the carbodiimide dispersion, such as no more than 95 percent by weight, such as no more than 90 percent by weight. The total solids content of the carbodiimide dispersion may be 40 percent by weight to 100 percent by weight based on total weight of the carbodiimide dispersion, such as 60 percent by weight to 100 percent by weight, such as 80 percent by weight to 100 percent by weight. As used herein, "total solids" when used with respect to the carbodiimide dispersion refers to the non-volatile content of the carbodiimide dispersion, i.e., materials which will not volatilize when heated to 30° C. for 30 minutes.

Optionally, according to the present invention, the first component may comprise one or more epoxy-containing compounds. As discussed above, the reactive diluent may be an epoxy-containing compound. The first component may further comprise an epoxy-containing compound that is not a reactive diluent (i.e., an epoxy-containing compound that has a viscosity at 25° C. of more than 20,000 mPa·s as measured according to ASTM D789).

Suitable epoxy-containing compounds that may be used in the first component may comprise polyepoxides. Suitable polyepoxides include polyglycidyl ethers of Bisphenol A, such as Epon® 828 and 1001 epoxy resins, and Bisphenol F diepoxides, such as Epon® 862, which are commercially available from Hexion Specialty Chemicals, Inc. Other suitable polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides that are derived from the epoxidation of an olefinically unsaturated nonaromatic cyclic compound, polyepoxides containing oxyalkylene groups in the epoxy molecule, and epoxy novolac resins. Still other suitable epoxy-containing compounds include epoxidized Bisphenol A novolacs, epoxidized phenolic novolacs, epoxidized cresylic novolac, and triglycidyl p-aminophenol bismaleimide. The epoxy-containing compound may also comprise an epoxy-dimer acid adduct. The epoxy-dimer acid adduct may be formed as the reaction product of reactants comprising a diepoxide compound (such as a polyglycidyl ether of Bisphenol A) and a dimer acid (such as a C36 dimer acid). The epoxy-containing compound may also comprise a carboxyl-terminated butadiene-acrylonitrile copolymer modified epoxy-containing compound. The epoxy-containing compound may also comprise epoxidized castor oil. Optionally, at least one of the epoxy-containing compounds may comprise the elastomeric particles (described below).

According to the present invention, the epoxy-containing compound may comprise an epoxy-adduct. The first component may comprise one or more epoxy-adducts. As used herein, the term "epoxy-adduct" refers to a reaction product comprising the residue of an epoxy compound and at least one other compound that does not include an epoxide functional group. For example, the epoxy-adduct may comprise the reaction product of reactants comprising: (1) an epoxy compound, a polyol, and an anhydride; (2) an epoxy compound, a polyol, and a diacid; or (3) an epoxy compound, a polyol, an anhydride, and a diacid.

According to the present invention, the epoxy compound used to form the epoxy-adduct may comprise any of the epoxy-containing compounds listed above that may be included in the first component.

According to the present invention, the polyol used to form the epoxy-adduct may include diols, triols, tetraols and higher functional polyols. Combinations of such polyols may also be used. The polyols may be based on a polyether chain derived from ethylene glycol, propylene glycol, butylene glycol, hexylene glycol and the like as well as mixtures thereof. The polyol may also be based on a polyester chain derived from ring opening polymerization of caprolactone (referred to as polycaprolactone-based polyols hereinafter). Suitable polyols may also include polyether polyols, polyurethane polyols, polyurea polyols, acrylic polyols, polyester polyols, polybutadiene polyols, hydrogenated polybutadiene polyols, polycarbonate polyols, polysiloxane polyols, and combinations thereof. Polyamines corresponding to polyols may also be used, and in this case, amides instead of carboxylic esters will be formed with the diacids and anhydrides.

The polyol may comprise a polycaprolactone-based polyol. The polycaprolactone-based polyols may comprise diols, triols or tetraols terminated with primary hydroxyl groups. Commercially available polycaprolactone-based polyols include those sold under the trade name Capa™ from Perstorp Group, such as, for example, Capa 2054, Capa 2077A, Capa 2085, Capa 2205, Capa 3031, Capa 3050, Capa 3091 and Capa 4101.

The polyol may comprise a polytetrahydrofuran-based polyol. The polytetrahydrofuran-based polyols may comprise diols, triols or tetraols terminated with primary hydroxyl groups. Commercially available polytetrahydrofuran-based polyols include those sold under the trade name Terathane®, such as Terathane® PTMEG 250 and Terathane® PTMEG 650 which are blends of linear diols in which the hydroxyl groups are separated by repeating tetramethylene ether groups, available from Invista. In addition, polyols based on dimer diols sold under the trade names Pripol®, Solvermol™ and Empol®, available from Cognis Corporation, or bio-based polyols, such as the tetrafunctional polyol Agrol 4.0, available from BioBased Technologies, may also be utilized.

According to the present invention, the anhydride used to form the epoxy-adduct may comprise any suitable acid anhydride known in the art. For example, the anhydride may comprise hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromelletic dianhydride (PMDA); 3,3',4,4'-oxydiphthalic dianhydride (ODPA); 3,3',4,4'-benzopherone tetracarboxylic dianhydride (BTDA); and 4,4'-diphthalic (hexafluoroisopropylidene) anhydride (6FDA).

According to the present invention, the diacid used to form the epoxy-adduct may comprise any suitable diacid known in the art. For example, the diacids may comprise phthalic acid and its derivates (e.g., methyl phthalic acid), hexahydrophthalic acid and its derivatives (e.g., methyl hexahydrophthalic acid), maleic acid, succinic acid, adipic acid, and the like.

According to the present invention, the epoxy-adduct may comprise a diol, a monoanhydride or a diacid, and a diepoxy compound, wherein the mole ratio of diol to monoanhydride (or diacid) to diepoxy compounds in the epoxy-adduct may vary from 0.5:0.8:1.0 to 0.5:1.0:6.0.

According to the present invention, the epoxy-adduct may comprise a triol, a monoanhydride or a diacid, and a diepoxy compound, wherein the mole ratio of triol to monoanhydride (or diacid) to diepoxy compounds in the epoxy-adduct may vary from 0.5:0.8:1.0 to 0.5:1.0:6.0.

According to the present invention, the epoxy-adduct may comprise a tetraol, a monoanhydride or a diacid, and a diepoxy compound, wherein the mole ratio of tetraol to monoanhydride (or diacid) to diepoxy compounds in the epoxy-adduct may vary from 0.5:0.8:1.0 to 0.5:1.0:6.0.

The epoxy-containing compound that is not a reactive diluent, when used, may be present in the first component of the adhesive composition in an amount of at least 2 percent by weight based on the total weight of the composition, such as at least 5 percent by weight, such as at least 10 percent by weight, and may be present in an amount of no more than 40 percent by weight based on total weight of the composition, such as no more than 30 percent by weight, such as no more than 25 percent by weight. The epoxy-containing compound that is not a reactive diluent may be present in the first component in an amount of 2 percent by weight to 40 percent by weight based on the total weight of the composition, such as 5 percent by weight to 30 percent by weight, such as 10 percent by weight to 25 percent by weight.

According to the present invention, the composition further comprises a second component that chemically reacts with the first component. That is, the second component comprises a curing agent. The curing agent may comprise an amine, an acid, including monomeric and polymeric acids such as carboxylic acid, a thiol, an alcohol such as a phenol, and/or other active hydrogen-containing compounds.

Upon mixing or combining the first and second components of the composition, the curing agent may be used to cure the composition by reacting the active hydrogen group of the curing agent of the second component with the carbodiimide functional group of the carbodiimide, the epoxide-functional group of the reactive diluent, and/or the epoxide-functional group of an epoxy-containing compound that is not a reactive diluent of the first component to form a polymeric matrix. As will be discussed in more detail below, the curing conditions used to cure the composition optionally may comprise a two-step curing process.

The curing agent may comprise an active hydrogen-containing compound. For example, the curing agent may comprise an amine, an acid, an alcohol, and/or a thiol. Suitable amines for use in the present invention can be selected from a wide variety of known amines such as primary amines and/or secondary amines. The amine may include monoamines, or polyamines having at least two functional groups such as di-, tri-, or higher functional amines; and mixtures thereof. The amine may be aromatic or aliphatic such as cycloaliphatic, or mixtures thereof. Non-limiting examples of suitable amines may include aliphatic polyamines such as but not limited to ethylamine, isomeric propylamines, butylamines, pentylamines, hexylamines, cyclohexylamine, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluoylene diamine, 2,4'- and/or 4,4'-diamino-dicyclohexyl methane and 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof.

The amine may include a primary amine, such as but not limited to polyoxyalkyleneamine. Suitable polyoxyalkyleneamines may contain two or more primary amino groups attached to a backbone derived, for example, from propylene oxide, ethylene oxide, or mixtures thereof. Non-limiting examples of such amines may include those available under the designation JEFFAMINE from Huntsman Corporation. Such amines may have a molecular weight ranging from 200 to 7500, such as but not limited to JEFFAMINE D-230, D-400, D-2000, T-403, T-5000, XJS-616, and ED600. Other suitable amines include aliphatic and cycloaliphatic polyamines such as the Ancamine® series available from Evonik.

The amine may include a secondary amine, such as but not limited to dimethylamine, diethylamine, methyl propylamine, methyl ethanolamine, diethanolamine, N-allylmethylamine, Jeffamine secondary amine series such as SD-231, SD-401, and ST-404, cyclic secondary amines such as aziridine, azepane, pyrrolidine, piperazine, morphline, 1-(allyl)pyrrolidine-2-methylamine, and the like, and combinations thereof.

In examples, the amine may comprise an alkanolamine. As used herein, the term “alkanolamine” refers to a compound comprising a nitrogen atom bonded to at least one alkanol substituent comprising an alkyl group comprising a primary, secondary or tertiary hydroxyl group. The alkanolamine may have the general structure $R^1{}_nN(R^2—OH)_{3-n}$, wherein $R^1$ comprises hydrogen or an alkyl group, $R^2$ comprises an alkanediyl group, and n=0, 1 or 2. When n=2, two $R^1$ groups will be present, and these groups may be the same or different. When n=0 or 1, 2 or 3 $R^2$—OH groups will be present, and these groups may be the same or different. The alkyl groups comprise aliphatic linear or branched carbon chains that may be unsubstituted or substituted with, for example, ether groups. Suitable alkanolamines include monoalkanolamines such as ethanolamine, N-methylethanolamine, 1-amino-2-propanol, and the like, dialkanolamines such as diethanolamine, diisopropanolamine, and the like, and trialkanolamines such as trimethanolamine, triethanolamine, tripropanolamine, tributanolamine, tripentanolamine, trihexanolamine, triisopropanolamine, and the like.

The alkanolamine may serve dual-purposes in the composition. For one, the alkanolamine may function as a catalyst during the first-step, the second-step, or both steps of the two-step curing process. For another, the alkanolamine may serve as a reactant during the second-step of the two-step curing process as the hydroxyl group(s) of the alkanolamine may react with the epoxide groups of the epoxy-containing compounds during cure.

Suitable examples of acids for use as the curing agent include monomeric and polymeric acids, such as a carboxylic acid. In examples, the acid may be a difunctional acid. Examples of carboxylic acids include, but are not limited to, formic acid, acetic acid, citric acid, propionic acid, dimer acid (fatty acid), trimer acid, butyric acid, benzoic acid, phenolic acid (such as cardanol), (meth)acrylic acid, terephthalic acid, suberic acid, sebacic acid, trimellitic acid, 4,4-bis(4-hydroxyphenyl)(valeric acid), polymeric acids, and the like and combinations thereof. As used herein, the term “(meth)acrylic acid” refers to either/or methacrylic acid and acrylic acid.

Suitable examples alcohols for use as the curing agent include aromatic or aliphatic alcohols. Suitable examples of aromatic alcohols include phenols, resorcinol, catechol, bisphenol A (BPA), bisphenol F (BPF), diallyl BPA, lignin, and the like and combinations thereof.

Suitable examples of aliphatic alcohols include, but are not limited to, methanol, ethanol, propanol, butanol, glycol, polyethylene oxide, polypropylene oxide and the like and combinations thereof.

The curing agent may comprise a thiol, such as a polythiol curing agent. As used herein, a “polythiol curing agent” refers to a chemical compound having at least two thiol functional groups (—SH).

The polythiol curing agent may comprise a compound comprising at least two thiol functional groups. The polythiol curing agent may comprise a dithiol, trithiol, tetrathiol, pentathiol, hexathiol or higher functional polythiol compound. The polythiol curing agent may comprise a dithiol compound including 3,6-dioxa-1,8-octanedithiol (DMDO), 3-oxa-1,5-pentanedithiol, 1,2-ethanedithiol, 1,3-propanedithiol, 1,2-propanedithiol, 1,4-butanedithiol, 1,3-butanedithiol, 2,3-butanedithiol, 1,5-pentanedithiol, 1,3-pentanedithiol, 1,6-hexanedithiol, 1,3-dithio-3-methylbutane, ethylcyclohexyldithiol (ECHDT), methylcyclohexyldithiol, methyl-substituted dimercaptodiethyl sulfide, dimethyl-substituted dimercaptodiethyl sulfide, 2,3-dimercapto-1-propanol, bis-(4-mercaptomethylphenyl) ether, 2,2'-thiodiethanethiol, and glycol dimercaptoacetate (commercially available as THIOCURE® GDMA from BRUNO BOCK Chemische Fabrik GmbH & Co. KG). The polythiol curing agent may comprise a trithiol compound including trimethylpropane trimercaptoacetate (commercially available as THIOCURE® TMPMA from BRUNO BOCK Chemische Fabrik GmbH & Co. KG), trimethylopropane tris-3-mercaptopropionate (commercially available as THIOCURE® TMPMP from BRUNO BOCK Chemische Fabrik GmbH & Co. KG), ethoxylated trimethylpropane tris-3-mercaptopropionate polymer (commercially available as THIOCURE® ETTMP from BRUNO BOCK Chemische Fabrik GmbH & Co. KG), tris[2-(3-mercaptopropionyloxy)ethyl]isocyanurate (commercially available as THIOCURE® TEMPIC from BRUNO BOCK Chemische Fabrik GmbH & Co. KG). The polythiol curing agent may comprise a tetrathiol compound including pentaerythritol tetramercaptoacetate (commercially available as THIOCURE® PETMA from BRUNO BOCK Chemische Fabrik GmbH & Co. KG), pentaerythritol tetra-3-mercaptopropionate (commercially available as THIOCURE® PETMP from BRUNO BOCK Chemische Fabrik GmbH & Co. KG), and polycaprolactone tetra(3-mercaptopropionate) (commercially available as THIOCURE® PCL4MP 1350 from BRUNO BOCK Chemische Fabrik GmbH & Co. KG). Higher functional polythiol curing agents may include dipentaerythritol hexa-3-mercaptopropionate (commercially available as THIOCURE® DiPETMP from BRUNO BOCK Chemische Fabrik GmbH & Co. KG). Combinations of polythiol curing agents may also be used.

The thiol curing agent may comprise a mercaptan terminated polysulfide. Commercially available mercaptan terminated polysulfides includes those sold under the trade name THIOKOL® LP from Torray Fine Chemicals Co., Ltd., including, but not limited to, LP-3, LP-33, LP-23, LP-980, LP-2, LP-32, LP-12, LP-31, LP-55 and LP-56. The THIOKOL LP mercaptan terminated polysulfides have the general structure $HS—(C_2H_4—O—CH_2—O—C_2H_4—S—S)_nC_2H_4—O—CH_2—O—C_2H_4—SH$, wherein n is an integer of 5 to 50. Other commercially available mercaptan terminated polysulfides include those sold under the trade name THIOPLAST® G™ from AkzoNobel Functional Chemicals GmbH, including, but not limited to, G 10, G 112, G 131, G 1, G 12, G 21, G 22, G 44 and G 4. The THIOPLAST G mercaptan terminated polysulfides are blends of di- and tri-functional mercaptan-functional polysulfides with the difunctional unit having the structure $HS—(R—S—S)_n—R—SH$, wherein n is an integer from 7 to 38, and the tri-functional unit having the structure $HS—(R—S—S)_a—CH_2—CH((S—S—R)_c—SH)—CH_2—(S—S—R)_b—SH$, wherein a+b+c=n and n is an integer from 7 to 38.

The thiol curing agent may comprise a mercaptan terminated polyether. Commercially available mercaptan terminated polyether include POLYTHIOL QE-340M available from Toray Fine Chemicals Co., Ltd.

The thiol optionally used in the composition of the present invention may have a calculated molecular weight of at least 94 g/mol, such as at least 490 g/mol, and may have a calculated molecular weight of no more than 2,000 g/mol, such as no more than 780 g/mol. The thiol of the present invention may have a calculated molecular weight of 94 g/mol to 2,000 g/mol, such as 490 g/mol to 780 g/mol.

Optionally, the thiol curing agent may be substantially free of disulfide (S—S) bonds. Substantially free, when used with respect to the absence of S—S bonds in the thiol curing agent means that there is no detectable signal above the noise in a Raman Spectrum, such as for example at 500 $cm^{-1}$.

Optionally, the second component may be substantially free, or essentially free, or completely free, of thiol-containing compounds.

The curing agent may be present in the second component of the composition according to the present invention in an amount of at least 2 percent by weight based on the total weight of total composition, such as at least 5 percent by weight, such as at least 10 percent by weight, such as at least 12 percent by weight, and may be present in an amount of no more than 50 percent by weight based on total weight of the composition, such as no more than 40 percent by weight, such as no more than 30 percent by weight, such as no more than 25 percent by weight. The curing agent may be present in the second component of the composition in an amount of 2 percent to 50 percent by weight based on the total weight of the composition, such as 5 percent to 40 percent by weight, such as 10 percent to 30 percent by weight, such as 12 percent to 25 percent by weight.

In some examples, the curing agent may comprise a thiol and an alkanolamine. In such examples, the thiol-containing compound may be present in the second component in any of the amounts described above and the alkanolamine may be present in the second component of the composition in an amount of at least 0.5 percent by weight based on the total weight of the composition, such as at least 1 percent by weight, such as at least 2 percent by weight, such as at least 5 percent by weight, and may be present in an amount of no more than 40 percent by weight based on total weight of the composition, such as no more than 30 percent by weight, such as no more than 20 percent by weight, such as no more than 10 percent by weight. In such examples, the alkanolamine may be present in the second component of the composition in an amount of 0.5 percent to 40 percent by weight based on the total weight of the composition, such as 1 percent to 30 percent by weight, such as 2 percent to 20 percent by weight, such as 5 percent to 10 percent by weight.

According to the present invention, the second component of the composition may comprise one or more accelerators. The accelerator may actively catalyze the reaction of the carbodiimide, a reactive diluent, and/or an epoxy-containing compound that is not a reactive diluent with the curing agent at ambient or slightly thermal conditions and optionally during the second step of the optional two-step curing process. That is, the accelerator may remain catalytically active during the second-step of the two-step curing process. The accelerator may comprise a tertiary amine, a cyclic tertiary amine, and/or a secondary amine that reacts with an epoxide group of a reactive diluent or an epoxy-containing compound that is not a reactive diluent (if either or both are present) at room temperature to form a tertiary amine. The accelerator also may comprise a secondary amine that reacts with a hydrogen-functional group of the curing agent to form an ion that may further react with an epoxide group of a reactive diluent and/or of an epoxy-containing compound that is not a reactive diluent to form a tertiary amine. The secondary amine may also react with an epoxide group of a reactive diluent and/or of an epoxy-containing compound that is not a reactive diluent to form a tertiary amine. The accelerator may comprise 1,4-diazabicyclo[2.2.2]octane ("DABCO"), 1,8-diazabicylo[5.4.0]undec-7-ene ("DBU"), 1,5-diazabicyclo[4.3.0]non-5-ene ("DBN"), 1,5,7-triazabicyclo[4.4.0]dec-5-ene ("TBD"), and combinations thereof. Additional examples of suitable accelerators include, pyridine, imidazole, dimethylaminopyridine, 1-methylimidazole, N,N'-carbonyldiimidazole, [2,2]bipyridine, 2,4,6-tris (dimethylamino methyl)phenol, 3,5-dimethylpyrazole, and combinations thereof.

The accelerator may be present in the second component of the composition in an amount of at least 0.02 percent by weight based on the total weight of the composition, such as at least 0.05 percent by weight, such as at least 0.1 percent by weight, and may be present in an amount of no more than 1 percent by weight based on total weight of the composition, such as no more than 0.5 percent by weight, such as no more than 0.25 percent by weight. The accelerator may be present in the second component of the composition in an amount of 0.02 percent to 1 percent by weight based on the total weight of the composition, such as 0.05 percent to 0.5 percent by weight, such as 0.1 percent to 0.25 percent by weight.

According to the present invention, the composition may be substantially free of accelerators comprising an aromatic amine. As used herein, the term "aromatic amine" refers to an amine compound having an aromatic group. Examples of aromatic groups include phenyl and benzyl groups. As used herein, a composition may be "substantially free" of accelerators comprising an aromatic amine if aromatic amine-containing accelerators are present in an amount of 0.1 percent or less by weight based on the total weight of the composition. The composition may be essentially free of accelerators comprising an aromatic amine. As used herein, a composition may be "essentially free" of an accelerator comprising an aromatic amine if aromatic amine-containing accelerators are present in an amount of 0.01 percent or less by weight based on the total weight of the composition. The composition may be completely free of accelerators comprising an aromatic amine. As used herein, a composition may be "completely free" of an accelerator comprising an aromatic amine if aromatic amine-containing accelerators are not present in the composition, i.e., 0.00 percent by weight.

According to the present invention, the composition may optionally comprise one or more latent accelerators. As used herein, the term "second-step accelerator" refers to a heat-activated latent accelerator that catalyzes the curing reactions of the composition during the second-step of the curing process only. As used herein, a "heat-activated latent accelerator" refers to a compound that requires activation from the application of heat to the composition prior to the heat-activated latent catalyst having a catalytic effect. For example, the heat-activated latent accelerator may be in the form of a solid at room temperature and have no catalytic effect until it is heated and melts, or the heat-activated latent accelerator may be reversibly reacted with a second compound that prevents any catalytic effect until the reversible reaction is reversed by the application of heat and the second compound is removed, freeing the accelerator to catalyze reactions.

The second-step accelerators that may be used include guanidines, substituted guanidines, substituted ureas, melamine resins, guanamine derivatives, heat-activated cyclic tertiary amines, aromatic amines and/or mixtures thereof. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethylethoxymethylbenzoguanamine. In addition, catalytically-active substituted ureas may also be used. Suitable catalytically-active substituted ureas include p-chlorophenyl-N,N-dimethylurea, 3-phenyl-1,1-dimethylurea (fenuron) or 3,4-dichlorophenyl-N,N-dimethylurea (also known as Diuron).

The second-step accelerator may also comprise a reaction product of reactants comprising (i) an epoxy compound, and (ii) an amine and/or an alkaloid. For example, the (b) heat-activated latent accelerator may comprise a reaction product of reactants comprising (i) an epoxy compound and (ii) an amine, or a reaction product of reactants comprising (i) an epoxy compound and (ii) an alkaloid. Such heat-activated latent accelerators are described in paragraphs [0098] through [0110] of U.S. Publication No. 2014/0150970, the cited portion of which is incorporated herein by reference. Examples of non-limiting commercially available second-step accelerators comprising a reaction product of reactants comprising (i) an epoxy compound, and (ii) an amine and/or an alkaloid include the products sold under the trade name Ajicure including Ajicure PN-23, Ajicure PN-H, Ajicure PN-31, Ajicure PN-40, Ajicure PN-50, Ajicure PN-23J, Ajicure PN-31J, Ajicure PN-40J, Ajicure MY-24 and Ajicure MY-2, available from Ajinomoto Fine-Techno Co., Inc.

The second-step accelerator may be present in the second component of the composition in an amount of at least 1 percent by weight based on the total weight of the coating composition, such as at least 5 percent by weight, such as at least 7 percent by weight, and may be present in an amount of no more than 20 percent by weight based on total weight of the coating composition, such as no more than 15 percent by weight, such as no more than 13 percent by weight. The second-step accelerator may be present in the second component of the composition in an amount of 1 percent to 20 percent by weight based on the total weight of the coating composition, such as 5 percent to 15 percent by weight, such as 7 percent to 13 percent by weight.

According to the present invention, the composition may be substantially free, essentially free, or completely free of a second-step accelerator. As used herein, a composition is "substantially free" of a second-step accelerator if the second-step accelerator is present in an amount of less than 1 percent by weight based on the total weight of the composition. As used herein, a composition is "essentially free" of a second-step accelerator if the second-step curing accelerator is present in an amount of less than 0.1 percent by weight based on the total weight of the composition. As used herein, a composition is "completely free" of a second-step accelerator if the second-step curing accelerator is not present the composition, i.e., 0.0 percent by weight.

According to the present invention, the first-step accelerators and second-step accelerators may be present in the second component of the composition in a combined amount of at least 0.5 percent by weight based on total weight of the coating composition, such as at least 5 percent by weight, such as at least 8 percent by weight, and may be present in an amount of no more than 17 percent by weight based on total weight of the coating composition, such as no more than 15 percent by weight, such as no more than 13 percent by weight, based on the total weight of the coating composition. The first-step accelerators and second-step accelerators may be present in the second component of the composition in a combined amount of 0.5 percent to 17 percent by weight based on total weight of the coating composition, such as 5 percent to 15 percent by weight, such as 8 percent to 13 percent by weight.

Either the first component and/or the second component of the composition optionally may further comprise elastomeric particles. As used herein, "elastomeric particles" refers to particles having a glass transition temperature (Tg) of −70° C. to 0° C. as measured by DSC. The elastomeric particles may have a core/shell structure. Suitable core-shell elastomeric particles may be comprised of butadiene rubber or other synthetic rubbers, such as styrene-butadiene, silicone rubber, siloxane, and acrylonitrile-butadiene and the like, butyl acrylate, and/or 2-ethylhexyl acrylate. The type of elastomeric particles and the concentration thereof is not limited as long as the particle size falls within the specified range as illustrated below. In an example, the elastomeric particles may be undispersed. In an example, the elastomeric particles may be dispersed, for example, in one of the epoxy-containing compounds described above.

The average particle size of the elastomeric particles may be from 0.02 microns to 500 microns (20 nm to 500,000 nm), for example, the reported particle size for rubber particles provided by Kanekea Texas Corporation, as measured by standard techniques known in the industry, such as, for example, according to ISO 13320 and ISO 22412.

As noted above, the elastomeric particles optionally may be included in an epoxy carrier resin for introduction into the composition. Suitable finely dispersed core-shell elastomeric particles having an average particle size ranging from 50 nm to 250 nm may be master-batched in epoxy resin such as aromatic epoxides, phenolic novolac epoxy resin, bisphenol A and/or bisphenol F diepoxide, and/or aliphatic epoxides, which include cyclo-aliphatic epoxides, at concentrations ranging from 5 percent to 40 percent rubber particles by weight based on the total weight of the rubber dispersion, such as from 20 percent to 35 percent Suitable epoxy resins may also include a mixture of epoxy resins. When utilized, the epoxy carrier resin may be an epoxy-containing component of the present invention such that the weight of the epoxy-containing component present in the composition includes the weight of the epoxy carrier resin.

Exemplary non-limiting commercial core-shell elastomeric particle products using poly(butadiene) rubber particles that may be utilized in the composition of the present invention include a core-shell poly(butadiene) rubber dispersion (25 percent rubber by weight) in bisphenol F diglycidyl ether (commercially available as Kane Ace MX 136), a core-shell poly(butadiene) rubber dispersion (33 percent rubber by weight) in Epon® 828 (commercially available as Kane Ace MX 153), a core-shell poly(butadiene) rubber dispersion (37 percent rubber by weight) in bisphenol A diglycidyl ether (commercially available as Kane Ace MX 257), a core-shell poly(butadiene) rubber dispersion (37 percent rubber by weight) in bisphenol F diglycidyl ether (commercially available as Kane Ace MX 267), and a core-shell poly(butadiene) rubber dispersion (40 percent rubber by weight) in bisphenol A diglycidyl ether (commercially available as Kane Ace MX 150), each available from Kaneka Texas Corporation.

Exemplary non-limiting commercial core-shell rubber particle products using styrene-butadiene rubber particles that may be utilized in the composition include a core-shell styrene-butadiene rubber dispersion (33 percent rubber by weight) in low viscosity bisphenol A diglycidyl ether (commercially available as Kane Ace MX 113), a core-shell styrene-butadiene rubber dispersion (25 percent rubber by weight) in bisphenol A diglycidyl ether (commercially available as Kane Ace MX 125), a core-shell styrene-butadiene rubber dispersion (25 percent rubber by weight) in D.E.N.™-438 phenolic novolac epoxy (commercially available as Kane Ace MX 215), a core-shell styrene-butadiene rubber dispersion (25 percent rubber by weight) in Araldite® MY-721 multi-functional epoxy (commercially available as Kane Ace MX 416), a core-shell styrene-butadiene rubber dispersion (25 percent rubber by weight) in MY-0510 multi-functional epoxy (commercially available as Kane Ace MX 451), a core-shell styrene-butadiene rubber dispersion (25 percent rubber by weight) in Syna Epoxy 21 Cyclo-aliphatic Epoxy from Synasia (commercially available as Kane Ace MX 551), and a core-shell styrene-butadiene rubber dispersion (25 percent rubber by weight) in polypropylene glycol (MW 400) (commercially available as Kane Ace MX 715), each available from Kaneka Texas Corporation. Other commercially available core-shell rubber particle dispersions include Fortegra 352 (33 percent core-shell rubber particles by weight in bisphenol A liquid epoxy resin), available from Olin Corporation. Other commercially available core-shell rubber particle include Paraloid™ EXL 2650A (core-shell poly(butadiene) commercially available from Dow).

Other exemplary elastomeric particles include silicone rubber having a core-shell rubber dispersion (25 percent rubber by weight) in bisphenol A diglycidyl ether (commercially available as Kane Ace MX 960).

The elastomeric particles may be present in the first component and/or the second component of the composition in a total amount of at least 3 percent by weight based on the total weight of the composition, such as at least 5 percent by weight, such as at least 7 percent by weight, such as at least 10 percent by weight, and may be present in an amount of no more than 40 percent by weight based on total weight of the composition, such as no more than 35 percent by weight, such as no more than 30 percent by weight, such as no more than 20 percent by weight. The elastomeric particles may be present in the first component and/or the second component of the composition in an amount of 3 percent by weight to 40 percent by weight based on the total weight of the composition, such as 5 percent by weight to 35 percent by weight, such as 7 percent by weight to 30 percent by weight, such as 10 percent by weight to 20 percent by weight.

Additives such as organic and/or inorganic fillers, reinforcement fillers, thixotropes, colorants, dyes, tints, and/or other materials (collectively, "additives") optionally may be added to the first component and/or the second component of the coating composition. Useful additives that may be introduced include cellulose, starch, silica ($SiO_2$), borosilicate, aluminosilicate, calcium carbonate, mica, calcium oxide (CaO), wollastonite, carbon black, clay minerals, organo clay, Castor wax, fibers, glass beads, graphenic carbon fibers, and the like, and combinations thereof.

The term "mica" generally refers to sheet silicate (phyllosilicate) minerals. The mica may comprise muscovite mica. Muscovite mica comprises a phyllosilicate mineral of aluminum and potassium with the formula $KAl_2(AlSi_3O_{10})(F,OH)_2$ or $(KF)_2(Al_2O_3)_3(SiO_2)_6(H_2O)$. Exemplary non-limiting commercially available muscovite mica include products sold under the trade name DakotaPURE™, such as DakotaPURE™ 700, DakotaPURE™ 1500, DakotaPURE™ 2400, DakotaPURE™ 3000, DakotaPURE™ 3500 and DakotaPURE™ 4000, available from Pacer Minerals.

The silica may comprise fumed silica which comprises silica that has been treated with a flame to form a three-dimensional structure. The fumed silica may be untreated or surface treated with a siloxane, such as, for example, polydimethylsiloxane. Exemplary non-limiting commercially available fumed silica includes products solder under the trade name AEROSIL®, such as AEROSIL® R 104, AEROSIL® R 106, AEROSIL® R 202, AEROSIL® R 208, commercially available from Evonik Industries.

Wollastonite comprises a calcium inosilicate mineral ($CaSiO_3$) that may contain small amounts of iron, aluminum, magnesium, manganese, titanium and/or potassium. The wollastonite may have a B.E.T. surface area of 1.5 to 2.1 $m^2/g$, such as 1.8 $m^2/g$ and a median particle size of 6 microns to 10 microns, such as 8 microns. Non-limiting examples of commercially available wollastonite include NYAD 400 available from NYCO Minerals, Inc. Useful clay minerals include a non-ionic platy filler such as talc, pyrophyllite, chlorite, vermiculite, or combinations thereof.

Useful fibers include acrylic fibers, engineered cellulose fibers, fiberglass, fibrous titanium dioxide, fibrous alumina, carbon fiber including graphite and carbon nanotubes. Examples of synthetic fibers include Aramid® fiber and Kevlar® fiber.

The calcium carbonate may comprise a precipitated calcium carbonate or a ground calcium carbonate. The calcium carbonate may or may not be surface treated with stearic acid. Non-limiting examples of commercially available precipitated calcium carbonate include Ultra-Pflex®, Albafil®, and Albacar HO® available from Specialty Minerals and Winnofil® SPT available from Solvay. Non-limiting examples of commercially available ground calcium carbonate include Duramite™ available from IMERYS and Marblewhite® available from Specialty Minerals.

As used herein, the term "graphenic carbon particles" means carbon particles having structures comprising one or more layers of one-atom-thick planar sheets of sp2-bonded carbon atoms that are densely packed in a honeycomb crystal lattice. The average number of stacked layers may be less than 100, for example, less than 50. The average number of stacked layers may be 30 or less, such as 20 or less, such as 10 or less, such as 5 or less. The graphenic carbon particles may be substantially flat; however, at least a portion of the planar sheets may be substantially curved, curled, creased, or buckled. The particles typically do not have a spheroidal or equiaxed morphology. Suitable graphenic carbon particles are described in U.S. Publication No. 2012/0129980, at paragraphs [0059]-[0065], the cited portion of which in incorporated herein by reference. Other suitable graphenic carbon particles are described in U.S. Publication No. 2014/0299270, at paragraphs [0039]-[0054], the cited portion of which in incorporated herein by reference.

Useful colorants, dyes, or tints may include red iron pigment, titanium dioxide, calcium carbonate, and phthalocyanine blue and combinations thereof.

Optionally, such additives, if present at all, may be present in an amount of at least 0.1 percent by weight based on total weight of the composition, such as no more than 0.5 percent by weight, such as no more than 1 percent by weight, such as no more than 5 percent by weight, such as no more than 15 percent by weight, such as no more than 30 percent by weight, and may be present in an amount of no more than 50 percent by weight based on total weight of the composition, such as no more than 45 percent by weight, such as no more than 20 percent by weight, such as no more than 10 percent by weight. Optionally, such additives, if present at all, may be present in an amount of 0.1 percent by weight to 50 percent by weight based on total weight of the composition, such as 0.5 percent by weight to 45 percent by weight, such as 30 percent by weight to 45 percent by weight, such as 15 percent by weight to 20 percent by weight, such as 1 percent by weight to 10 percent by weight.

Optionally, the composition may be substantially free, or essentially free, or completely free, of platy fillers such as mica, talc, pyrophyllite, chlorite, vermiculite, or combinations thereof.

According to the present invention, the composition may be substantially free of a color change indicator. As used herein, the term "color change indicator" refers to a compound that at least partially changes the color of the composition during the curing process. Examples of color change indicators include inorganic and organic dyes, such as azo compounds or azo dyes, including Solvent Red 26 (1-[[2,5-dimethyl-4-[(2-methylphenyl)azo]-phenyl]azo]-2-naphthol) and Solvent Red 164 (1-[[4-[phenylazo]-phenyl]azo]-2-naphtholor), as well as pH dependent color change indicators, such as, for example, phenolphthalein. As used herein, a composition is "substantially free" of color change indicator if color change indicator is present in the composition in an amount of 0.05 percent by weight or less, based on the total weight of the composition. The composition may be essentially free of color change indicator. As used herein, a composition is "essentially free" of color change indicator if color change indicator is present in the composition in an amount of 0.01 percent by weight or less, based on the total weight of the composition. The composition may be completely free of color change indicator. As used herein, a composition is "completely free" of color change indicator if color change indicator is not present in the composition, i.e., 0.0 percent by weight.

According to the present invention, the composition may be substantially free of silane. As used herein, a composition is "substantially free" of silane if silane is present in the composition in an amount of 0.5 percent by weight or less, based on the total weight of the composition. The composition may be essentially free of silane. As used herein, a composition is "essentially free" of silane if silane is present in the composition in an amount of 0.1 percent by weight or less, based on the total weight of the composition. The composition may be completely free of silane. As used herein, a composition is "completely free" of silane if silane is not present in the composition, i.e., 0.0 percent by weight.

According to the present invention, the composition may be substantially free, essentially free, or completely free of unreacted isocyanate functional groups. As used herein, a composition is "substantially free" of unreacted isocyanate functional groups if the composition has >10,000 g/Eq of NCO functional groups as determined by titration as described in the Examples. As used herein, a composition is "completely free" of unreacted isocyanate functional groups if the composition has >12,000 g/Eq of NCO functional groups as determined by titration as described in the Examples.

According to the present invention, a weight ratio of the first component to the second component may be at least 1:10, such as at least 1:5, such as at least 1:3, and may be no more than 10:1, such as no more than 5:1, such as no more than 3:1. A weight ratio of the first component to the second component may be 1:10 to 10:1, such as 1:5 to 5:1, such as 1:3 to 3:1.

Optionally, the compositions of the present invention may be subjected to a two-step curing process wherein (1) at least a portion of the first component and the second component chemically react when mixed at ambient or slightly thermal conditions to partially cure the composition without activation from an external energy source, followed by (2) the application of an external energy source to the composition to further cure the composition. As further defined herein, ambient conditions generally refer to room temperature (about 23° C.) and humidity conditions (e.g., about 50%) or temperature and humidity conditions that are typically found in the area in which the adhesive is being applied to a substrate, while slightly thermal conditions are temperatures that are slightly above ambient temperature, such as 10% greater, such as 20% greater, such as 30% greater than ambient temperature and/or humidity, but are generally below the curing temperature for the second-step of the two-step curing process.

In examples, the present invention is directed to a two-component adhesive composition comprising, or consisting essentially of, or consisting of, a first component and a second component. The first component may comprise, consist essentially of, or consist of a diluent, such as a reactive diluent, and a carbodiimide. The second component may comprise, consist essentially of, or consist of a curing agent that chemically reacts with the reactive diluent and/or the carbodiimide of the first component, the curing agent comprising an active hydrogen-containing compound. The adhesive composition may be used to bond together two substrate materials for a wide variety of potential applications in which the bond between the substrate materials may provide particular mechanical properties related to lap shear strength. The adhesive may be applied to either one or both of the materials being bonded. The pieces may be aligned, and pressure and spacers may be added to control bond thickness. In examples, the “green strength” of the adhesive bond following at least partially cure at ambient conditions may have a lap shear strength of greater than 0.1 MPa, as determined according to ASTM D1002-10 by using an Instron 5567 machine in tensile mode with a pull rate of 1.0 mm per minute. The green strength of the adhesive bond may be reached after allowing the adhesive composition to cure at ambient conditions for about 5 hours, such as about 1 hour, such as about 0.5 hour, such as about 0.3 hour. The composition may also be subjected to curing conditions such as the two-step cure process described herein such that a substantially complete cure is attained and wherein further curing results in no significant further improvement in the adhesive properties such as, for example, lap shear strength. An adhesive will be considered to be “cured” after the two-step curing process when the adhesive bond has a lap shear strength of greater than 5 MPa, as determined according to ASTM D1002-10 by using an Instron 5567 machine in tensile mode with a pull rate of 1 mm per minute. Surprisingly, the adhesive composition of the present invention may form an adhesive having a lap shear strength of greater than 10 MPa, as determined according to ASTM D1002-10 by using an Instron 5567 machine in tensile mode with a pull rate of 1 mm per minute.

In examples, the present invention is directed to a two-component sealant composition comprising, or consisting essentially of, or consisting of, a first component and a second component. The first component may comprise, consist essentially of, or consist of a non-reactive diluent and a carbodiimide. The second component may comprise, consist essentially of, or consist of a curing agent that chemically reacts with the carbodiimide of the first component, the curing agent comprising an active hydrogen-containing compound. The sealant may surprisingly be able to sustain a maximum load of at least 0.3 MPa measured according to ASTM D-412 using a dog bone specimen (shown in FIG. 1) on an Instron model 5569 with a pull rate of 50 mm/min, such as at least 0.5 MPa; and/or surprisingly may have an elongation at break of at least 10% measured according to ASTM D-412 using a dog bone specimen (shown in FIG. 1) on an Instron model 5569 with a pull rate of 50 mm/min. Such maximum loads and elongations at break may be achieved when the sealant composition is at least partially cured by the two-step cure process described herein, including a second step such as baking at a temperature of 180° C. or below, such as 130° C. or below, such as 110° C. or below, such as 100° C. or below, such as 90° C. or below, such as 80° C. or below, such as 70° C. or below, but greater than ambient, such as greater than 40° C., such as greater than 50° C., for any desired time period sufficient to at least partially cure the composition, e.g., 5 minutes to 5 hours, such as 0.3 hours to 2 hours, such as 0.4 hours to 1 hour.

The present invention also relates to a method for preparing a coating composition, such as an adhesive composition or a sealant composition. The method may comprise, consist essentially of, or consist of, mixing a carbodiimide and a diluent with at least one of the curing agents described above and optionally one or more of the further optional ingredients described in the foregoing at a temperature of less than 50° C., such as from 0° C. to 50° C., such as from 15° C. to 35° C., such as at ambient or slightly thermal temperatures. The method optionally may further comprise, consist essentially of, or consist of, subjecting the composition to the second-step curing process described above.

The composition described above may be applied alone or as part of a system that can be deposited in a number of different ways onto a number of different substrates. The system may comprise a number of the same or different films, coatings, or layers. A film, coating, or layer is typically formed when a composition that is deposited onto at least a portion of the substrate surface is at least partially dried or cured by methods known to those of ordinary skill in the art (e.g., under ambient or slightly thermal conditions and optionally by exposure to the second step of the two-step curing process described above, e.g., thermal heating).

The composition can be applied to the surface of a substrate in any number of different ways, non-limiting examples of which include brushes, rollers, films, pellets, trowels, spatulas, dips, spray guns and applicator guns to form a coating on at least a portion of the substrate surface. Alternatively, the composition may be casted, extruded, molded, or machined to form a part or a member in at least partially dried or cured state.

After application to the substrate(s), the composition may be cured. For example, the composition may be allowed to at least partially cure at room temperature or slightly thermal conditions and/or the composition may be cured by baking and/or curing at elevated temperature, such as at a temperature of 180° C. or below, such as 130° C. or below, such as 110° C. or below, such as 100° C. or below, such as 90° C. or below, such as 80° C. or below, such as 70° C. or below, but greater than ambient, such as greater than 40° C., such as greater than 50° C., and for any desired time period (e.g., from 5 minutes to 1 hour) sufficient to at least partially cure the composition. Alternatively, the composition of the present invention may at least partially cure at ambient or slightly above ambient conditions.

The present invention also is directed to a method for treating a substrate comprising, or consisting essentially of, or consisting of, contacting at least a portion of a surface of the substrate with one of the compositions of the present invention described hereinabove. The composition may be cured to form a coating, layer or film on the substrate surface under ambient conditions or by exposure to an external energy source, for example such as by heating the substrate to a temperature of less than 180° C., such as less than 130°

C., such as less than 90° C. The coating, layer or film, may be, for example, a sealant or an adhesive.

The present invention is also directed to a method for forming a bond between two substrates for a wide variety of potential applications in which the bond between the substrates provides particular mechanical properties related to lap shear strength. The method may comprise, or consist essentially of, or consist of, applying the composition described above to a first substrate; contacting a second substrate to the composition such that the composition is located between the first substrate and the second substrate; and curing the composition under ambient or slightly thermal conditions and/or by exposure to an external energy source, for example such as by heating to a temperature of less than 180° C., such as less than 130° C., such as less than 90° C. For example, the composition may be applied to either one or both of the substrate materials being bonded to form an adhesive bond therebetween and the substrates may be aligned, and pressure and/or spacers may be added to control bond thickness. The composition may be applied to cleaned or uncleaned (i.e., including oily or oiled) substrate surfaces.

Optionally, after application to the substrate(s), the composition may be cured. Cure may be accomplished by a two-step curing process as described herein. For example, the adhesive may be allowed to cure at room temperature or slightly thermal conditions during the first step. Next, the adhesive may be cured during the second step by baking and/or curing at elevated temperature, such as at a temperature of at least 70° C., such as at least 80° C., such as at least 110° C., such as at least 120° C., such as at least 125° C., such as at least 130° C., and in some cases at a temperature of no more than 200° C., such as no more than 180° C., such as no more than 170° C., such as no more than 165° C., and in some cases at a temperature of from 70° C. to 200° C., from 120° C. to 180° C., from 125° C. to 170° C., from 130° C. to 165° C., and for any desired time period (e.g., from 5 minutes to 1 hour) sufficient to at least partially cure the adhesive composition on the substrate(s).

The coating compositions of the present invention may be applied to substrate surfaces, including, by way of non-limiting example, a vehicle body or components of an automobile frame or an airplane. The coating compositions may be applied to cleaned or uncleaned (i.e., including oily or oiled) substrate surfaces. The coating compositions also may be applied to a substrate that has been pretreated, coated with an electrodepositable coating, coated with additional layers such as a primer, basecoat, or topcoat. The coating composition may dry or cure at ambient conditions once applied to a substrate and/or substrates coated with coating compositions may optionally subsequently be baked in an oven to cure the coating composition.

After the adhesive composition is applied to a substrate and at least partially cured to form an adhesive:

(a) the adhesive bonding the substrates together surprisingly may have a green strength of at least 0.1 MPa as measured according to test method ASTM D1002-10 by an Instron model 5567 in tensile mode, such as at least 0.5 MPa, such as at least 1 MPa, such as at least 2 MPa, such as at least 3 MPa, such as at least 4 MPa, and may have a green strength of 0.1 MPa to less than 5 MPa as measured according to test method ASTM D1002-10 by an Instron model 5567 in tensile mode, such as 0.5 MPA to less than 5 MPa, such as 1 MPa to less than 5 MPa, such as 2 MPa to less than 5 MPa, such as 3 MPa to less than 5 MPa, such as 4 MPa to less than 5 MPa; and/or (b) the adhesive bonding the substrates together surprisingly may have an adhesive strength of at least 10.0 MPa after 2 hours exposure to ambient temperature and heating at 175° C. for 30 minutes as measured according to test method ASTM D1002-10 by an Instron model 5567 in tensile mode, such as an adhesive strength of at least 15 MPa, such as an adhesive strength of at least 20 MPa.

After the sealant composition is applied to a substrate and at least partially cured as described herein:

(a) the sealant surprisingly may sustain a maximum load of at least 0.3 MPa measured according to ASTM D-412 using a dog bone specimen (as shown in FIG. 1) on an Instron model 5569 with a pull rate of 50 mm/min, such as at least 0.5 MPa, such as at least 1 MPa; and/or (b) the sealant surprisingly may have an elongation at break of at least 10% measured according to ASTM D-412 using a dog bone specimen (as shown in FIG. 1) on an Instron model 5569 with a pull rate of 50 mm/min, such as at least 15%, such as at least 20%.

The substrates that may be coated by the compositions of the present invention are not limited. Suitable substrates useful in the present invention include, but are not limited to, materials such as metals or metal alloys, polymeric materials such as hard plastics including filled and unfilled thermoplastic materials or thermoset materials, or composite materials. Other suitable substrates useful in the present invention include, but are not limited to, glass or natural materials such as wood. For example, suitable substrates include rigid metal substrates such as ferrous metals, aluminum, aluminum alloys, magnesium titanium, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Aluminum alloys of the 1XXX, 2XXX, 3XXX, 4XXX, 5XXX, 6XXX, 7XXX, or 8XXX series as well as clad aluminum alloys and cast aluminum alloys of the A356, 1XX.X, 2XX.X, 3XX.X, 4XX.X, 5XX.X, 6XX.X, 7XX.X, or 8XX.X series also may be used as the substrate. Magnesium alloys of the AZ31B, AZ91C, AM60B, or EV31A series also may be used as the substrate. The substrate used in the present invention may also comprise titanium and/or titanium alloys of grades 1-36 including H grade variants. Other suitable non-ferrous metals include copper and magnesium, as well as alloys of these materials. Suitable metal substrates for use in the present invention include those that are used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, and industrial structures and components. As used herein, "vehicle" or variations thereof includes, but is not limited to, civilian, commercial and military aircraft, land vehicles such as cars, motorcycles, and/or trucks, farm equipment such as tractors, plows, harrows and the like, and/or heavy equipment such as excavators, backhoes, forklifts, and the like. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos.

4,793,867 and 5,588,989, or a zirconium containing pretreatment solution such as, for example, those described in U.S. Pat. Nos. 7,749,368 and 8,673,091. The substrate may comprise a composite material such as a plastic or a fiberglass composite. The substrate may be a fiberglass and/or carbon fiber composite. The compositions of the present invention are particularly suitable for use in various industrial or transportation applications including automotive, light and heavy commercial vehicles, marine, or aerospace.

The 2K compositions disclosed herein surprisingly may be used in any suitable additive manufacturing technology, such as extrusion, jetting, and binder jetting.

The present disclosure is directed to the production of structural articles, such as by way of non-limiting example, sound damping pads, using three-dimensional printing. A three-dimensional article may be produced by forming successive portions or layers of an article by depositing the composition of the present invention onto a substrate and thereafter depositing additional portions or layers of the composition over the underlying deposited portion or layer and/or adjacent the previously deposited portion or layer. Layers can be successively deposited adjacent a previously deposited layer to build a printed article. First and second components of the composition can be mixed and then deposited or the first and second components of the composition can be deposited separately. When deposited separately, the first and second components can be deposited simultaneously, sequentially, or both simultaneously and sequentially.

By "portions of an article" is meant subunits of an article, such as layers of an article. The layers may be on successive horizontal parallel planes. The portions may be parallel planes of the deposited material or beads of the deposited material produced as discreet droplets or as a continuous stream of material. The first and second components may each be provided neat or may also include a solvent (organic and/or water) and/or other additives as described below. First and second components provided by the present disclosure may be substantially free of solvent. By substantially free is meant that the first and second components comprise less than 5 wt %, less than 4 wt %, less than 2 wt %, or less than 1 wt % of solvent, where wt % is based on the total weight of the first component or the second component, as the case may be. Similarly, the composition provided by the present disclosure may be substantially free of solvent, such as having less than 5 wt %, less than 4 wt %, less than 2 wt %, or less than 1 wt % of solvent, where wt % is based on the total weight of the composition.

The first and second components may be mixed together and subsequently deposited as a mixture of components that react to form portions of an article. For example, two components may be mixed together and deposited as a mixture of components that react to form a thermoset by delivery of at least two separate streams of the components into a mixer such as a static mixer and/or a dynamic mixer to produce a single stream that is then deposited. The components may be at least partially reacted by the time a composition comprising the reaction mixture is deposited. The deposited reaction mixture may react at least in part after deposition and may also react with previously deposited portions and/or subsequently deposited portions of the article such as underlying layers or overlying layers of the article.

Two or more components can be deposited using any suitable equipment. The selection of suitable deposition equipment depends on a number of factors including the deposition volume, the viscosity of the composition and the complexity of the part being fabricated. Each of the two or more components can be introduced into an independent pump and injected into a mixer to combine and mix the two components. A nozzle can be coupled to the mixer and the mixed composition can be pushed under pressure or extruded through the nozzle.

A pump can be, for example, a positive displacement pump, a syringe pump, a piston pump, or a progressive cavity pump. The two pumps delivering the two components can be placed in parallel or placed in series. A suitable pump can be capable of pushing a liquid or viscous liquid through a nozzle orifice. This process can also be referred to as extrusion. A component can be introduced into the mixer using two pumps in series.

For example, the first and second components can be deposited by dispensing materials through a disposable nozzle attached to a progressive cavity two-component dosing system such as a ViscoTec eco-DUO 450 precision dosing system, where the first and second components are mixed in-line. A two-component dosing system can comprise, for example, two progressive cavity pumps that separately dose reactants into a disposable static mixer dispenser or into a dynamic mixer. Other suitable pumps include positive displacement pumps, syringe pumps, piston pumps, and progressive cavity pumps. Upon dispensing, the materials of the first and second components form an extrudate which can be deposited onto a surface to provide an initial layer of material and successive layers on a base. The deposition system can be positioned orthogonal to the base, but also may be set at any suitable angle to form the extrudate such that the extrudate and deposition system form an obtuse angle with the extrudate being parallel to the base. The extrudate refers to the combined components, i.e., a composition, that have been mixed, for example, in a static mixer or in a dynamic mixer. The extrudate can be shaped upon passing through a nozzle.

The base, the deposition system, or both the base and the deposition system may be moved to build up a three-dimensional article. The motion can be made in a predetermined manner, which may be accomplished using any suitable CAD/CAM method and apparatus such as robotics and/or computerize machine tool interfaces.

An extrudate may be dispensed continuously or intermittently to form an initial layer and successive layers. For intermittent deposition, a dosing system may interface with a relay switch to shut off the pumps, such as the progressive cavity pumps and stop the flow of reactive materials. Any suitable switch such as an electromechanical switch that can be conveniently controlled by any suitable CAD/CAM methodology can be used.

A deposition system can include an in-line static and/or dynamic mixer as well as separate pressurized pumping compartments to hold the at least two components and feed the materials into the static and/or dynamic mixer. A mixer such as an active mixer can comprise a variable speed central impeller having high shear blades within a conical nozzle. A range of conical nozzles may be used which have an exit orifice dimension, for example, from 0.2 mm to 50 mm, from 0.5 mm to 40 mm, from 1 mm to 30 mm, or from 5 mm to 20 mm.

A range of static and/or dynamic mixing nozzles may be used which have, for example, an exit orifice dimension from 0.6 mm to 2.5 mm, and a length from 30 mm to 150 mm. For example, an exit orifice diameter can be from 0.2 mm to 4.0 mm, from 0.4 mm to 3.0 mm, from 0.6 mm to 2.5 mm, from 0.8 mm to 2 mm, or from 1.0 mm to 1.6 mm. A static mixer and/or dynamic can have a length, for example, from 10 mm to 200 mm, from 20 mm to 175 mm, from 30 mm to 150 mm, or from 50 mm to 100 mm. A mixing nozzle can include a static and/or dynamic mixing section and a dispensing section coupled to the static and/or dynamic mixing section. The static and/or dynamic mixing section can be configured to combine and mix the first and second components. The dispensing section can be, for example, a straight tube having any of the above orifice diameters. The length of the dispensing section can be configured to provide a region in which the components can begin to react and build viscosity before being deposited on the article. The length of the dispensing section can be selected, for example, based on the speed of deposition, the rate of reaction of the first and second components, and the desired viscosity.

First and second components can have a residence time in the static and/or dynamic mixing nozzle, for example, from 0.25 seconds to 5 seconds, from 0.3 seconds to 4 seconds, from 0.5 seconds to 3 seconds, or from 1 seconds to 3 seconds. Other residence times can be used as appropriate based on the curing chemistries and curing rates.

In general, a suitable residence time is less than the gel time of the composition. A suitable gel time can be less than 10 min, less than 8 min, less than 6 min, less than 5 min, less than 4 min, less than 3 min, less than 2 min, or less than 1 min. A gel time of the composition can be, for example, from 0.5 min to 10 min, from 1 min to 7 min, from 2 min to 6 min, or from 3 min to 5 min.

Compositions provided by the present disclosure can have a volume flow rate, for example, from 0.1 mL/min to 20,000 mL/min, such as from 1 mL/min to 12,000 mL/min, from 5 mL/min to 8,000 mL/min, or from 10 mL/min to 6,000 mL min. The volume flow rate can depend, for example, on the viscosity of the composition, the extrusion pressure, the nozzle diameter, and the reaction rate of the first and second components.

A composition can be used at a print speed, for example, from 1 mm/sec to 400 mm/sec, such as from 5 mm/sec to 300 mm/sec, from 10 mm/sec to 200 mm/sec, or from 15 mm/sec to 150 mm/sec. The printed speed can depend, for example, on the viscosity of the composition, the extrusion pressure, the nozzle diameter, and the reaction rate of the components. The print speed refers to the speed at which a nozzle used to extrude a composition move with respect to a surface onto which the composition is being deposited.

A composition can have a gel time, for example, less than 5 minutes, less than 4 minutes, less than 3 minutes, less than 2 minutes, less than 1 minute, less than 45 seconds, less than 30 seconds, less than 15 seconds, or less than 5 seconds. A composition can have a gel time, for example, from 0.1 seconds to 5 minutes, from 0.2 seconds to 3 minutes, from 0.5 seconds to 2 minutes, from 1 second to 1 minute, or from 2 seconds to 40 seconds. Gel time is considered as the time following mixing when the composition is no longer stirrable by hand.

A static and/or dynamic mixing nozzle can be heated or cooled to control, for example, the rate of reaction between the first and second components and/or the viscosity of the first and second components. An orifice of a deposition nozzle can have any suitable shape and dimensions. A system can comprise multiple deposition nozzles. The nozzles can have a fixed orifice dimension and shape, or the nozzle orifice can be controllably adjusted. The mixer and/or the nozzle may be cooled to control an exotherm generated by the reaction of the first and second components.

Methods provided by the present disclosure include printing the composition on a fabricated part. Methods provided by the present disclosure include directly printing parts.

Using the methods provided by the present disclosure parts can be fabricated. The entire part can be formed from one of the compositions disclosed herein, one or more portions of a part can be formed from one of the compositions disclosed herein, one or more different portions of a part can be formed using the compositions disclosed herein, and/or one or surfaces of a part can be formed from a composition provided by the present disclosure. In addition, internal regions of a part can be formed from a composition provided by the present disclosure.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

In view of the foregoing the present invention thus relates inter alia, without being limited thereto, to the following Aspects:

1. A two-component coating composition, comprising:
   a first component comprising a carbodiimide and a diluent, wherein the carbodiimide is present in an amount of no more than 50 percent by weight based on total weight of the coating composition; and
   a second component comprising a curing agent that chemically reacts with the carbodiimide, the curing agent comprising an active hydrogen-containing compound.
2. The coating composition according to Aspect 1, wherein the composition is substantially free of unreacted isocyanate functional groups.
3. The coating composition according to any one of the preceding Aspects, wherein the diluent comprises a reactive diluent.
4. The coating composition according to Aspect 3, wherein the reactive diluent comprises an epoxy-containing compound.
5. The coating composition according to any one of Aspect 1 or Aspect 2, wherein the diluent comprises a non-reactive diluent.
6. The coating composition according to any one of the preceding Aspects, wherein the carbodiimide comprises a urethane group and/or a urea group.
7. The coating composition according to any one of the preceding Aspects, wherein the carbodiimide is present in the composition in an amount of 5 percent by weight to 50 percent by weight based on total weight of the composition.
8. The coating composition according to any one of the preceding Aspects, wherein the carbodiimide has an Mw of 1,000 g/mol to 10,000 g/mol as measured by GPC using polystyrene standards and waters Styragel column in THF solvent.
9. The coating composition according to any one of the preceding Aspects, wherein the active hydrogen-containing compound comprises an amine, an acid, an alcohol, and/or a thiol.

10. The coating composition according to Aspect 9, wherein the amine comprises a primary amine and/or a secondary amine.
11. The coating composition according to any one of preceding Aspects 9 or 10, wherein the acid comprises a difunctional acid.
12. The coating composition according to any one of the preceding Aspects 9 to 11, wherein the thiol comprises at least two thiol functional groups.
13. The coating composition according to Aspect 12, wherein the thiol comprises pentaerythritol tetra-3-mercaptopropionate.
14. The coating composition according to any one of the preceding Aspects 9 to 13, wherein the thiol is substantially free of S—S bonds.
15. The coating composition according to any one of the preceding Aspects 9 to 14, wherein the thiol has a calculated molecular weight of 94 g/mol to 2,000 g/mol.
16. The coating composition according to any one of preceding Aspects 1 to 11, wherein the second component is substantially free of thiol.
17. The coating composition according to Aspect 9, wherein the amine comprises an alkanolamine.
18. The coating composition according to Aspect 17, wherein the alkanolamine comprises triethanolamine.
19. The coating composition according to any one of Aspects 17 or 18, wherein the alkanolamine is present in the second component of the composition in an amount of at least 0.5% by weight based on the total weight of the coating composition.
20. The coating composition according to any one of Aspects 17 to 19, wherein the curing agent comprises the alkanolamine and a thiol, an acid, and/or an alcohol.
21. The coating composition according to Aspect 20, wherein a weight ratio of the thiol, the acid, and/or the alcohol to the alkanolamine is 1:1 to 22:1.
22. The coating composition according to any one of the preceding Aspects, wherein a weight ratio of the first component to the second component is 1:10 to 10:1.
23. The coating composition according to any one of the preceding Aspects, wherein the coating composition further comprises an epoxy-containing compound that is not a reactive diluent, elastomeric particles, an additive, and/or an accelerator.
24. The coating composition according to any one of the preceding Aspects, wherein the coating composition is substantially free of a color change indicator, aromatic amine curing catalysts and/or silane.
25. The coating composition according to any one of the preceding Aspects, wherein the coating composition comprises an adhesive composition.
26. The coating composition according to any one of the preceding Aspects, wherein the coating composition comprises a sealing composition.
27. A substrate, comprising the coating composition of any one of the preceding Aspects 1 to 26 positioned on at least a portion of a surface of the substrate.
28. The substrate of preceding Aspect 27, wherein the composition, in an at least partially cured state:
(a) is able to sustain a maximum load of at least 0.3 MPa measured according to ASTM D-412 using a dog bone specimen on an Instron model 5569 with a pull rate of 50 mm/min; and/or
(b) has an elongation at break of at least 10% measured according to ASTM D-412 using a dog bone specimen on an Instron model 5569 with a pull rate of 50 mm/min
29. An article, comprising the substrate of any one of the preceding Aspects 27 or 28 and a second substrate, wherein the coating composition is positioned between the surface of the substrate and a surface of the second substrate.
30. The article of preceding Aspect 29, wherein the composition, in an at least partially cured state:
(a) has a green strength of at least 0.1 MPa measured according to test method ASTM D1002-10 by an Instron model 5567 in tensile mode; and/or
(b) has an adhesive strength of at least 10.0 MPa after 2 hours exposure to ambient temperature and heating at 175° C. for 30 minutes measured according to test method ASTM D1002-10 by an Instron model 5567 in tensile mode.
31. A part comprising the substrate of any one of preceding Aspects 27 or 28.
32. The part of preceding Aspect 31, wherein the part comprises a three-dimensional part.
33. A vehicle, comprising the substrate of any one of preceding Aspects 27 or 28, the article of any one of preceding Aspects 29 or 30, and/or the article of any one of preceding Aspects 31 or 32.
34. A method for forming a coating on a first substrate, comprising applying the coating composition of any one of preceding Aspects 1 to 26 to at least a portion of a surface of the first substrate and at least partially curing the coating composition at ambient or slightly thermal conditions.
35. The method of preceding Aspect 34, further comprising exposing the composition to a temperature of at least 70° C.
36. The method of any one of preceding Aspects 34 or 35, further comprising contacting a surface of a second substrate with the coating composition such that the coating composition is located between the surface of the first substrate and the surface of the second substrate.
37. A method of forming an article comprising extruding the coating composition of any one of preceding Aspects 1 to 26 onto a substrate.
38. The method of preceding Aspect 37, wherein the extruding comprising three-dimensional printing.
39. The method of any one of preceding Aspects 37 or 38, further comprising, before extruding, combining and mixing the first component and the second component.
40. The method of any one of preceding Aspects 37 to 39, wherein the forming comprising applying successive layers to build the article.
41. An article formed by the method of any one of preceding Aspects 37 to 40.

EXAMPLES

Example A: Synthesis of Carbodiimide in Epoxy 1049.4 g of Desmodur W (commercially available from Covestro LLC and 7.9 g of 1-Methyl-1-Oxo-Phospholene (commercially available from Clariant Co.) were added to a 3-liter, 4-necked kettle equipped with a motor driven stainless steel stir blade, a water-cooled condenser, a nitrogen sparge, and a heating mantle with a thermometer connected through a temperature feedback control device. The contents of the kettle were heated to 160° C. and held for 5 hours until the NCO equivalent weight was approximately 451 measured by using a Metrohm 888 Titrando as described below. The reaction mixture was cooled to 100° C. and 486.1 g of Epon 828 (commercially available from Hexion Specialty Chemicals) was added into reaction mixture. At 100° C., 0.09 g of dibutyl tin dilaurate (commercially available from Air Products & Chemicals) and 155.2 g of butanol were added into reaction mixture. The reaction mixture was held at 100° C. until the NCO peak disappeared as measured by infrared spectroscopy (IR Spectrometer, ThermoScientific Nicolet iS5 FT-IR). Then 681.4 g of Epon 828 was added into the reaction mixture and held for 30 minutes. The weight average molecular weight (Mw) was 1776 g/mol as determined by Gel Permeation Chromatography using Waters 2695 separation module with a Waters 410 differential refractometer (RI detector) and polystyrene standards, tetrahydrofuran (THF) used as the eluent at a flow rate of 1 ml $min^{-1}$, and two PL Gel Mixed C columns used for separation.

Isocyanate equivalent weight was measured by titration by dissolving a sample having a weight of 0.003×theoretical isocyanate equivalent weight an appropriate size sample in 30 mL of a solution comprised of 20 ml of dibutylamine and 980 ml of either n-methyl pyrrolidone. The mixture then was titrated with 0.2 N HCl Solution in isopropanol titration agent.

Example B: Synthesis of Carbodiimide in DINP 262.2 g of Desmodur W (commercially available from Covestro LLC) and 2.0 g of 1-Methyl-1-Oxo-Phospholene (commercially available from Clariant Co.) were added to a 1-liter, 4-necked kettle equipped with a motor driven stainless steel stir blade, a water-cooled condenser, a nitrogen sparge, and a heating mantle with a thermometer connected through a temperature feedback control device. The contents of the kettle were heated to 160° C. and held for 4 hours until the NCO equivalent weight was 461.9, determined as described in Example A. The reaction mixture was cooled to 100° C. and 121.1 g of DINP (Diisononyl phthalate, commercially available from BASF) was added into the reaction mixture. At 100° C., 0.02 g of dibutyl tin dilaurate (commercially available from Air Products & Chemicals) and 37.6 g of butanol were added into reaction mixture. The reaction mixture was held at 100° C. until the NCO peak disappeared as described in Example A. Then 40 g of DINP was added into the reaction and held for 30 minutes. The weight average molecular weight was 2876 g/mol as determined by the procedure described in Example A.

Example C: Synthesis of Carbodiimide in DINP 262.2 g of Desmodur W (commercially available from Covestro LLC) and 2.0 g of 1-Methyl-1-Oxo-Phospholene (commercially available from Clariant Co.) were added to a 1-liter, 4-necked kettle equipped with a motor driven stainless steel stir blade, a water-cooled condenser, a nitrogen sparge, and a heating mantle with a thermometer connected through a temperature feedback control device. The contents of kettle were heated to 160° C. and held for 4 hours until the NCO equivalent weight was 469.4, determined as in Example A. The reaction mixture was cooled to 100° C. and 65.8 of DINP (Diisononyl phthalate, commercially available from BASF) was added into the reaction mixture. At 100° C., 0.02 g of dibutyl tin dilaurate (commercially available from Air products & Chemicals), and 223.0 g of KRASOL® LBH-P 2000 (commercially available from Cray Valley USA, LLC) were added into reaction mixture. After holding at 100° C. for 30 minutes, 15.0 g of butanol were added into reaction mixture. The reaction mixture was held at 100° C. until the NCO peak disappeared as described in Example A. Then 37.5 g of DINP was added into the reaction and held for 30 minutes. The weight average molecular weight was 11986 g/mol as determined by the procedure described in Example A.

Example D: Synthesis of Polycaprolactone Diol Modified Epoxy Resin 948 g of methylhexahydrophthalic anhydride ("MHHPA", commercially available from Dixie Chemical) and 4,054.7 g of Epon 828 (bisphenol A diglycidyl ether epoxy resin commercially available from Hexion Specialty Chemicals) were added to a 12-liter, 4-necked kettle equipped with a motor driven stainless steel stir blade, a water-cooled condenser, a nitrogen blanket, and a heating mantle with a thermometer connected through a temperature feedback control device. The contents of kettle were heated to 90° C. and held for 30 minutes. 2,064.0 g of Capa 2077A (polycaprolactone-based diol commercially available from Perstorp Group) was added and the reaction mixture was held at 90° C. for 30 minutes. 395.9 g of Epon 828 and 46.4 g of triphenyl phosphine (available from Sigma Aldrich) were added and the mixture exothermed and was heated to 120° C. after exotherm. The reaction mixture was held at 120° C. until the acid value was less than 2 mg KOH/g by titration using a Metrohm 888 Titrando and 0.1 N KOH solution in Methanol as the titration reagent. The reaction temperature was cooled to 80° C. and the resin was poured out from the kettle. The epoxy equivalent of this epoxy adduct was 424 g/epoxide as determined by titration using a Metrohm 888 Titrando and 0.1 N Perchloric acid in glacial acetic acid. The weight average molecular weight was 3,670 g/mol as determined by the method described in Example A. The epoxy adduct prepared by this procedure is referred to as CAPA di-/MHHPA/Epon 828 in the following Examples.

Example E: Synthesis of Polycaprolactone Tetraol Modified Epoxy Resin 1,038.6 g of MHHPA and 4,439.3 g of Epon 828 were added to a 12-liter, 4-necked kettle equipped with a motor driven stainless steel stir blade, a water-cooled condenser, a nitrogen blanket, and a heating mantle with a thermometer connected through a temperature feedback control device. The contents of kettle were heated to 90° C. and held for 30 minutes. 1,589.1 g of Capa 4101 (polycaprolactone-based tetraol commercially available from Perstorp Group) was added and the reaction mixture was held at 90° C. for 30 minutes. 433.5 g of Epon 828 and 43.6 g of triphenylphosphine were added and the mixture exothermed and was heated to 120° C. after exotherm. The reaction mixture was held at 120° C. until the acid value was less than 2 mg KOH/g as determined by the procedure described in Example C. The reaction mixture was cooled to 80° C. and the resin was poured out from kettle. The epoxy equivalent of this epoxy adduct was 412 g/epoxide as determined by the method described in Example C. The weight average molecular weight was 18,741 g/mol as determined by the procedure described in Example A. The epoxy adduct prepared by this procedure is referred to as CAPA tetra-/MHHPA/Epon 828 in the following Examples.

Adhesive Compositions—Examples 1-9

The two-component adhesive compositions described below were prepared according to the following procedure with all non-manual mixing performed using a Speedmixer DAC 600FVZ (commercially available from FlackTek Inc.). In each Example, the "Resin" ingredients listed under "Part A" in Tables 1-3 were warmed to 60° C. and then were combined and mixed for 25 seconds at 2,350 revolutions per minutes ("RPM"). Then, the "Filler" ingredients listed under Part A in Tables 1 and 2 were added and mixed for 25 seconds at 2,350 RPM. The mixture was examined with a spatula and mixed manually. As necessary, the high-speed mixing was repeated to ensure uniformity. In a separate vessel, all of the liquid ingredients listed under "Part B" were combined and then all of the solids were combined, and the ingredients were mixed for 15 seconds at 2,350 RPM. The mixture was examined with a spatula and mixed manually. As necessary, the high-speed mixing was repeated to ensure uniformity.

In Examples 1-9, hot dip galvanized (HDG) steel panels (0.8 mm×25 mm×100 mm; "coupons") available from ACT Test Panels LLC (item #55538). Substrates were cleaned using an acetone wipe. A thin coating of oil (Platinol B 804/3 COW-1) was evenly applied over the coupons in the bonding area. Then, the adhesive compositions of one of Examples 1-9 was applied to the oiled area six of the coupons of the bond assembly. The length of the bonded area was 13 mm and of the non-bonded area was 87 mm. Uniformity of bond thickness was ensured by addition of 0.25 mm glass spacer beads. The oiled face of the other test coupon was placed on the bond area and spring-loaded clips were attached (one to each side of the bond) to hold the assembly together. Excess adhesive that squeezed out was removed with a spatula. Bond assemblies were allowed to cure at ambient temperature for 2 hours. For each adhesive, three bond assemblies were either tested by lap shear (described below) and three bond assemblies were baked at 175° C. for 30 minutes. Baked samples were conditioned for at least 16 hours at ambient condition before lap shear testing. Data are presented in Tables 1 and 2. Each data point is an average of the triplicates run for each Example and cure condition.

Lap shear testing was performed by inserting non-bonded portions of the bond assemblies in wedge action grips and pulling apart at a rate of 1 mm/min using an Instron model 5567 in tensile mode. Except as noted, lap shear tests were conducted according to ASTM D1002-10. Shear strength was calculated by Instron's Blue Hill software package. Data are reported in Tables 1 and 2.

Open time was used to qualitatively assess how long the coating composition took to harden after Components A and B were homogenously mixed, where "harden" refers to the point that the coating composition was no longer deformable under manual pressure. Components A and B were mixed and retained in plastic screw top cups under ambient temperature and humidity. Free flowing material was considered unhardened. Slightly to moderately resistant material that could deform and spread under gentle manual force was considered slightly hardened. Material that could not be deformed or spread and which felt rigid was considered fully hardened.

Rheology data were collected on an Anton-Paar MCR301 rheometer with a parallel plate in rotational mode. The gap width was 500 μm. Viscosity was measured every 1 second for 71 seconds with a linear shear stress from 0 to 3,500 Pa. Viscosity data are reported as a function of shear stress.

TABLE 1

2K Adhesive Compositions (Examples 1-3) and Lap Shear Strength of Adhesives Cured at Ambient Conditions or following the 2-step curing process

| | Example 1 (g) | Example 2 (g) | Example 3 (g) |
|---|---|---|---|
| Part A | | | |
| Resins | | | |
| Carbodiimide in reactive diluent (Example A) (50 wt %: 50 wt %) | — | 5.2 | 5.2 |
| CAPA di-/MHHPA/Epon 828 (Example D) | 1.7 | 1.7 | 1.7 |
| CAPA tetra-/MHHPA/Epon 828 (Example E) | 2.0 | 2.0 | 2.0 |
| Epon 828[1] | 6.7 | 4.0 | 4.0 |
| Fillers | | | |
| DAKOTAPURE 3000 Mica[2] | 0.4 | 0.4 | 0.4 |
| Polycal OS325[3] | 0.4 | 0.4 | 0.4 |
| Aerosil R202[4] | 0.1 | 0.1 | 0.1 |
| Part B | | | |
| Fillers | | | |
| Dakota Pure 3000 | 1.0 | 1.0 | 1.0 |
| NYAD 400[5] | 1.5 | 1.5 | 1.5 |
| Aerosil R202 | 0.5 | 0.5 | 0.5 |
| #1922 Spheriglass solid "A"[6] | 0.2 | 0.2 | 0.2 |
| Crosslinkers | | | |
| Thiocure PETMP[7] | 4.6 | 4.6 | 4.6 |
| Triethanolamine[8] | 2.0 | 2.0 | 2.0 |
| Catalysts and additives | | | |
| Bisphenol A[9] | — | — | 1.1 |
| DABCO[10] | 0.05 | 0.05 | 0.05 |

TABLE 1-continued

2K Adhesive Compositions (Examples 1-3) and Lap Shear Strength of Adhesives Cured at Ambient Conditions or following the 2-step curing process

| | Example 1 (g) | Example 2 (g) | Example 3 (g) |
|---|---|---|---|
| Viscosity (mPa*s) | | | |
| Part A at 100 Pa shear stress | 1.2E+05 | 1.2E+06 | 9.2E+05 |
| Part A at 2,000 Pa shear stress | 1.0E+05 | 1.1E+06 | 8.8E+05 |
| Part B at 100 Pa Shear stress | 1.9E+08 | 1.9E+08 | 1.3E+07 |
| Part B at 2,000 Pa shear stress | 2.2E+04 | 2.2E+04 | 2.0E+04 |
| Mix ratio (part A to part B) | 1.43:1 | 1.75:1 | 1.57:1 |
| % Carbodiimide based on total weight of coating composition | 0% | 10% | 10% |
| Open time (minutes) | 3 | 5 | 7 |
| Lap shear (MPa) | | | |
| 2 h @ ambient temperature | 0.08 ± 0.03 | 0.16 ± 0.08 | 0.28 ± 0.23 |
| 2 h @ ambient + 175° C. for 30 min | 9.7 ± 2.3 | 11.9 ± 4.6 | 15.6 ± 0.6 |

[1]Bisphenol A epichlorohydrin resin available from Huntsman
[2]Potassium alumina silicate (mica) available from Pacer Corp.
[3]Calcium oxide (quicklime) available from Mississippi Lime Co.
[4]Hydrophobic fumed silica available from Evonik
[5]Calcium metasilicate (wollastonite) available from NYCO division of Imerys
[6]Soda-lime glass spacer beads available from Potters Industries
[7]Pentaerythritol Tetra(3-mercaptopropionate) available from Bruno Bock Thiochemicals
[8]Available from Sigma Aldrich (now Millipore Sigma)
[9]4,4'-Isopropylidenediphenol available from Hexion Specialty Chemicals
[10]1,4-Diazabicyclo[2.2.2]octane available from Sigma Aldrich (now Millipore Sigma)

The data in Table 1 show the effect that including carbodiimide in an adhesive composition has on lap shear strength of the adhesive following cure at either ambient conditions or at ambient conditions followed by baking (i.e., the two-step cure process). Example 1 (Comparative) did not contain carbodiimide, while Example 2 contained 10% by weight carbodiimide based on total weight of the composition, and Example 3 contained 10% by weight carbodiimide based on total weight of the composition and a phenolic curing agent (bisphenol A as a phenolic acid). These data demonstrate that including carbodiimide in the adhesive composition improves strength and that strength may be further improved by the synergistic effect of carbodiimide and acid.

TABLE 2

2K Adhesive Compositions (Examples 4-9) and Lap Shear Strength of Adhesives Cured at Ambient Conditions or following the 2-Step Curing Process

| | Example 4 (g) | Example 5 (g) | Example 6 (g) | Example 7 (g) | Example 8 (g) | Example 9 (g) |
|---|---|---|---|---|---|---|
| Part A | | | | | | |
| Resins | | | | | | |
| Carbodiimide in reactive diluent (Example A) (50 wt %:50 wt %) | 1.3 | 2.6 | 5.2 | 7.8 | 10.4 | 13.0 |
| CAPA di-/MHHPA/Epon 828 (Example D) | 1.7 | 1.7 | 1.7 | 1.7 | 1.7 | 1.7 |
| CAPA tetra-/MHHPA/ Epon 828 (Example E) | 2.0 | 2.0 | 2.0 | 2.0 | 2.0 | 2.0 |
| Epon 828[1] | 6.0 | 5.3 | 4.0 | 2.6 | 1.3 | — |
| Fillers | | | | | | |
| DAKOTAPURE 3000 Mica[2] | 0.4 | 0.4 | 0.4 | 0.4 | 0.4 | 0.4 |
| Polycal 0S325[3] | 0.4 | 0.4 | 0.4 | 0.4 | 0.4 | 0.4 |
| Aerosil R202[4] | 0.1 | 0.1 | 0.1 | 0.1 | 0.1 | 0.1 |
| Part B | | | | | | |
| Fillers | | | | | | |
| Dakota Pure 3000 | 1.0 | 1.0 | 1.0 | 1.0 | 1.0 | 1.0 |
| NYAD 400[5] | 1.5 | 1.5 | 1.5 | 1.5 | 1.5 | 1.5 |
| Aerosil R202 | 0.5 | 0.5 | 0.5 | 0.5 | 0.5 | 0.5 |
| #1922 Spheriglass solid "A"[6] | 0.2 | 0.2 | 0.2 | 0.2 | 0.2 | 0.2 |
| Crosslinkers | | | | | | |
| Thiocure PETMP[7] | 4.6 | 4.6 | 4.6 | 4.6 | 4.6 | 4.6 |
| Triethanolamine[8] | 2.0 | 2.0 | 2.0 | 2.0 | 2.0 | 2.0 |

TABLE 2-continued

2K Adhesive Compositions (Examples 4-9) and Lap Shear Strength of Adhesives Cured at Ambient Conditions or following the 2-Step Curing Process

| | Example 4 (g) | Example 5 (g) | Example 6 (g) | Example 7 (g) | Example 8 (g) | Example 9 (g) |
|---|---|---|---|---|---|---|
| Catalysts and additives | | | | | | |
| Bisphenol A[9] | 0.3 | 0.5 | 1.1 | 1.6 | 2.1 | 2.7 |
| DABCO[10] | 0.05 | 0.05 | 0.05 | 0.05 | 0.05 | 0.05 |
| Viscosity (mPa*s) | | | | | | |
| Part A at 100 Pa shear stress | 1.9E+05 | 3.5E+05 | 9.2E+05 | 2.1E+06 | 6.2E+06 | 1.9E+07 |
| Part A at 2,000 Pa shear stress | 1.6E+05 | 3.1E+05 | 8.8E+05 | 2.0E+06 | 6.2E+06 | 1.9E+07 |
| Part B at 100 Pa Shear stress | 9.1E+07 | 2.6E+07 | 1.3E+07 | 3.9E+06 | 1.0E+07 | 1.2E+06 |
| Part B at 2,000 Pa shear stress | 1.3E+04 | 1.9E+04 | 2.0E+04 | 2.8E+04 | 3.2E+04 | 5.5E+04 |
| Mix ratio (part A to part B) | 1.47:1 | 1.50:1 | 1.57:1 | 1.64:1 | 1.70:1 | 1.74:1 |
| % Carbodiimide based on total weight of coating composition | 2.5% | 5% | 10% | 15% | 20% | 25% |
| Open time (minutes) | 4 | 5 | 7 | 7 | <25 | <25 |
| Lap shear (MPa) | | | | | | |
| 2 h @ ambient temperature | 0.02 ± 0.01 | 0.08 ± 0.05 | 0.28 ± 0.23 | 0.61 ± 0.43 | 0.57 ± 0.10 | 0.08 ± 0.01 |
| 2 h @ ambient + 175° C. for 30 min | 10.9 ± 0.4 | 13.2 ± 0.1 | 15.6 ± 0.6 | 12.0 ± 1.6 | 10.6 ± 1.6 | 6.9 ± 1.1 |

[1]Bisphenol A epichlorohydrin resin available from Huntsman
[2]Potassium alumina silicate (mica) available from Pacer Corp.
[3]Calcium oxide (quicklime) available from Mississippi Lime Co.
[4]Hydrophobic fumed silica available from Evonik
[5]Calcium metasilicate (wollastonite) available from NYCO division of Imerys
[6]Soda-lime glass spacer beads available from Potters Industries
[7]Pentaerythritol Tetra(3-mercaptopropionate) available from Bruno Bock Thiochemicals
[8]Available from Sigma Aldrich (now Millipore Sigma)
[9]4,4'-Isopropylidenediphenol available from Hexion Specialty Chemicals
[10]1,4-Diazabicyclo[2.2.2]octane available from Sigma Aldrich (now Millipore Sigma)

The data in Table 2 show the effect that increasing amounts of the carbodiimide resin in an adhesive composition has on lap shear strength of the adhesive following cure at either ambient conditions or at ambient conditions followed by baking. Increasing amounts of carbodiimide in the adhesive composition improved lap shear strength of the adhesive following ambient cure (green strength) and ambient cure followed by baking (full bake). As illustrated in Table 2, the greatest green strength was achieved in Examples 7 and 8 (15 wt % carbodiimide based on total weight of the composition and 20% by weight) and the greatest lap shear strength for the adhesives exposed to full bake was achieved in Example 6 (10 wt % carbodiimide based on total weight of the composition). In Examples 4-9, the amount of Bisphenol A in each composition was proportionally increased with the amount of carbodiimide in the composition in order to match hydroxyl equivalents of bisphenol A to the —N═C═N— equivalents of the carbodiimide.

Sealant Compositions—Examples 10-18

The sealant compositions described below were prepared according to the following procedure with all non-manual mixing performed using a Speedmixer DAC 600FVZ (commercially available from FlackTek Inc.).

In each Example, the "Resins" ingredients and the "Plasticizers" ingredients listed under Part A in Table 3 were combined and mixed for 10-15 seconds at 2,350 RPM. Then, the "Fillers" ingredients listed under Part A in Table 3 were added and mixed for 10-15 seconds at 2,350 RPM. The mixture was examined with a spatula and given additional mix time, if necessary, to ensure uniformity. In a separate vessel, the "Cure Agents" ingredients and the "Plasticizers" ingredients listed under Part B in Table 3 were combined and mixed for 10-15 seconds at 2,350 RPM. Then, the "Fillers" ingredients listed under Part B in Table 3 were then added and mixed for 10-15 seconds at 2,350 RPM. The mixture was examined with a spatula and given additional mix time, if necessary, to ensure uniformity. For each of Examples 10-17, Parts A and B were combined in the ratios shown in Table 3, then mixed for 15 seconds at 2,350 RPM. Test specimens were prepared within five minutes of mixing (described below).

For the PVC-based comparative example (Example 18, Table 4), Jayflex DINP, Santicizer 278, and Admex 525 were combined and mixed for 5 seconds at 2,350 RPM. Then the solids were added and the mixture was mixed for 15 seconds at 2,350 RPM. The mineral spirits and the Nourybond were added and mixed for 15 seconds at 2,350 RPM. The mixture was examined with a spatula and given additional mix time, if necessary, to ensure uniformity.

In Examples 10-17, sealant compositions were drawn down with a 3 mm thick drawdown bar over a woven Teflon baking sheet secured to a steel 4"×12" panel. Sealants were baked at 80° C. for 30 minutes in an electric oven. Free film dog bone samples were allowed to cool and were kept under ambient conditions for at least 16 hours before die cutting into dog bones as shown in FIG. 1. Dog bone samples were pulled on the Instron model 5567 at a pull rate of 50 mm/min and a clamp distance of 30 mm (clamps gripped 10 mm of both ends of the sample). Five dog bones were run for each sealant and the average of the five is reported. Elongation (%) and maximum load (MPa) were determined from the plot of tensile stress versus strain. Data are reported in Table 3.

The data in Table 3 show the effect of increasing acid functionality (i.e., crosslink density) (Example 11) compared to Comparative Example 10 and increasing amine chain length (i.e., flexibility) (Example 12 (which contains a long chain length amine) and Example 13 (which contains both short and long chain length amines), Example 14 did not cure, making it impossible to measure the maximum load or elongation and showing that the carbodiimide was critical to the cure and could not be replaced with an amine- or acid-reactive material such as an epoxy. Examples 15-17 demonstrate that cure could be achieved with an amine curing agent. Comparative Example 18 used PVC chemistry and demonstrated that the carbodiimide-containing compositions of the present invention (Examples 10-13 and 15-17) produced sealants having improved strength and elongation when cured by the two-step curing process.

TABLE 3

Examples of 2K carbodiimide-based sealants.

| | Example 10 | Example 11 | Example 12 | Example 13 | Example 14 | Example 15 | Example 16 | Example 17 |
|---|---|---|---|---|---|---|---|---|
| Part A Resins | | | | | | | | |
| carbodiimide in DINP (Example B) | 37.5 | 37.5 | 37.5 | 37.5 | — | — | — | — |
| carbodiimide in DINP (Example C) | — | — | — | — | — | 30.4 | 30.4 | 22.8 |
| Epon 828[1] | — | — | — | — | 9.9 | — | — | — |
| Plasticizers | | | | | | | | |
| Jayflex DINP[11] | 2.4 | 2.4 | 2.4 | 2.4 | 21.2 | 2.9 | 2.9 | 2.2 |
| Fillers | | | | | | | | |
| Ultra Pflex[12] | 11.3 | 11.3 | 11.3 | 11.3 | 11.3 | 17.3 | 17.3 | 15.0 |
| Part B Cure agents | | | | | | | | |
| Pripol 1013[13] (96% dimer) | 15.1 | 7.6 | 7.6 | 7.6 | 7.6 | — | — | — |
| Pripol 1040[14] (22% dimer, 78% trimer) | — | 8.0 | 8.0 | 8.0 | 8.0 | — | — | — |
| Triethanolamine[8] | 7.9 | 7.9 | — | 3.9 | 3.9 | — | — | — |
| Jeffamine D400[15] | — | — | 5.3 | 2.6 | 2.6 | — | — | — |
| Jeffamine ® EDR-148[16] | — | — | — | — | — | 2.1 | 1.6 | — |
| Elastamine ® HT-1100[17] | — | — | — | — | — | — | 6.6 | 24.8 |
| Plasticizers | | | | | | | | |
| Jayflex DINP | 12.0 | 12.0 | 12.0 | 12.0 | 12.0 | 12.0 | 12.0 | 9.0 |
| Fillers | | | | | | | | |
| Ultra Pflex | 37.5 | 37.5 | 37.5 | 37.5 | 37.5 | 20.0 | 20.0 | 15.0 |
| Viscosity (mPa*s) | | | | | | | | |
| Part A at 100 Pa shear stress | 5.2E+05 | 5.2E+05 | 5.2E+05 | 5.2E+05 | | ND | ND | ND |
| Part A at 2,000 Pa shear stress | 3.0E+05 | 3.0E+05 | 3.0E+05 | 3.0E+05 | | ND | ND | ND |
| Part B at 100 Pa Shear stress | 2.4E+08 | 2.4E+08 | 1.4E+06 | 3.0E+06 | | ND | ND | ND |
| Part B at 2,000 Pa shear stress | 3.8E+07 | 6.0E+07 | 6.9E+05 | 9.8E+05 | | ND | ND | ND |
| Mix ratio (part A to part B) | 1:1.29 | 1:1.30 | 1:1.27 | 1:1.25 | 1:1.69 | 1:0.81 | 1:0.96 | 1:1.47 |

TABLE 3-continued

| Examples of 2K carbodiimide-based sealants. | | | | | | | | |
|---|---|---|---|---|---|---|---|---|
| | Example 10 | Example 11 | Example 12 | Example 13 | Example 14 | Example 15 | Example 16 | Example 17 |
| Maximum load (MPa) | 0.38 | 1.04 | 1.47 | 1.91 | N/A | 1.43 | 0.99 | 0.46 |
| Elongation at break (%) | 62 | 42 | 15 | 77 | N/A | 16 | 21 | 37 |

[1]Bisphenol A epichlorohydrin resin available from Huntsman
[8]Available from Sigma Aldrich (now Millipore Sigma)
[11]Diisononyl phthalate available from Exxon Mobile Corporation
[12]Coated precipitated calcium carbonate available from Specialty Minerals
[13]Polymerized (96% dimer, 2% trimer) fatty acid available from Croda Inc.
[14]Polymerized (22% dimer, 78% trimer) fatty acid available from Croda Inc.
[15]Polyoxypropylenediamine available from Huntsman
[16]Unhindered diamine polyetheramine available from Huntsman
17Poly(tetramethylene ether glycol) based amine available from Huntsman

TABLE 3

| Comparative example of a PVC sealant showing properties after baking at 80° C. for 30 minutes. | |
|---|---|
| | Example 18 |
| Jayflex DINP[11] | 33.8 |
| Santicizer 278[18] | 10.9 |
| Admex 525[19] | 5.4 |
| Ultra Pflex[12] | 52.5 |
| Polycal OS325[3] | 3.8 |
| Formolon 40[20] | 67.5 |
| Odorless mineral spirits[21] | 12.5 |
| Nourybond 289[22] | 23.1 |
| Maximum load (MPa) | 0.1 |
| Elongation at break (%) | 14 |

[3]Calcium oxide (quicklime) available from Mississippi Lime Co.
[11]Diisononyl phthalate available from Exxon Mobile Corporation
[12]Coated precipitated calcium carbonate available from Specialty Minerals
[18]Alkyl benzyl phthalate available from Valtris
[19]Low molecular weight, polymeric plasticizer available from Eastman
[20]Polyvinyl chloride-acetate resin available from Formosa Plastics
[21]Available from Exxon Mobile
[22]Blocked isocyanate resin available from Evonik It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:

1. A two-component coating composition, comprising:

a first component comprising:

a carbodiimide in an amount of at least 10 percent to no more than 22 percent by weight based on total weight of the coating composition;

an epoxy-containing compound in an amount of 2 percent by weight to 40 percent by weight based on total weight of the coating composition; and a diluent in an amount of 5 percent by weight to 55 percent by weight based on total weight of the coating composition; and a second component comprising a curing agent that chemically reacts with the carbodiimide, the curing agent comprising an active hydrogen-containing compound comprising a thiol-containing compound, wherein the thiol-containing compound is present in an amount of 2 percent by weight to 50 percent by weight based on total weight of the coating composition, wherein the coating composition is substantially free of unreacted isocyanate functional groups.

2. The coating composition of claim 1, wherein the diluent comprises a reactive diluent.

3. The coating composition of claim 2, wherein the reactive diluent comprises a second epoxy-containing compound.

4. The coating composition of claim 1, wherein the diluent comprises a non-reactive diluent.

5. The coating composition of claim 1, wherein the carbodiimide comprises a urethane group and/or a urea group.

6. The coating composition of claim 1, wherein the curing agent further comprises an amine, an acid, and/or an alcohol.

7. The coating composition of claim 6, wherein (a) the amine comprises a primary amine and/or a secondary amine, (b) the acid comprises a difunctional acid, and/or (c) the alcohol comprises a phenol.

8. The coating composition of claim 6, wherein the amine comprises an alkanolamine.

9. The coating composition of claim 1, wherein the thiol-containing compound is substantially free of S—S bonds.

10. The coating composition of claim 1, wherein the coating composition further comprises elastomeric particles, an additive, and/or an accelerator.

11. The coating composition of claim 1, wherein the coating composition is an adhesive composition.

12. The coating composition of claim 1, wherein the coating composition is a sealant composition.

13. The coating composition of claim 1, wherein the composition is substantially free of solvent.

14. The coating composition of claim 1, wherein the thiol-containing compound comprises at least two thiol functional groups.

15. A substrate, comprising the coating composition of claim 1 positioned on at least a portion of a surface of the substrate.

16. The substrate of claim 15, wherein the coating composition, in an at least partially cured state:

(a) is able to sustain a maximum load of at least 0.3 MPa measured according to ASTM D-412 using a dog bone specimen on an Instron model 5569 with a pull rate of 50 mm/min; and/or (b) has an elongation at break of at least 10% measured according to ASTM D-412 using a dog bone specimen on an Instron model 5569 with a pull rate of 50 mm/min.

17. An article, comprising the substrate of claim 15 and a second substrate, wherein the coating composition is positioned between the surface of the substrate and a surface of the second substrate.

18. The article of claim 17, wherein the coating composition, in an at least partially cured state:

(a) has a green strength of at least 0.1 MPa measured according to test method ASTM D1002-10 by an Instron model 5567 in tensile mode; and/or (b) has an adhesive strength of at least 10.0 MPa after 2 hours exposure to ambient temperature and heating at 175° C. for 30 minutes measured according to test method ASTM D1002-10 by an Instron model 5567 in tensile mode.

19. A part comprising the substrate of claim 15.

20. The part of claim 19, wherein the part comprises a three-dimensional part.

21. A vehicle, comprising the substrate of claim 15.

22. A method for forming a coating on a first substrate, comprising applying the coating composition of claim 1 to at least a portion of a surface of the first substrate and at least partially curing the coating composition at ambient or slightly thermal conditions.

23. The method of claim 22, further comprising exposing the coating composition to a temperature of at least 70° C.

24. The method of claim 22, further comprising contacting a surface of a second substrate with the coating composition such that the coating composition is located between the surface of the first substrate and the surface of the second substrate.

25. A method of forming an article comprising extruding the coating composition of claim 1 onto a substrate.

26. The method of claim 25, wherein the extruding comprises three-dimensional printing.

27. The method of claim 26, further comprising, before extruding, combining and mixing the first component and the second component.

28. The method of claim 26, wherein the forming comprising applying successive layers to build the article.

29. An article formed by the method of claim 25.

* * * * *